United States Patent
Mao

(10) Patent No.: US 11,032,539 B2
(45) Date of Patent: Jun. 8, 2021

(54) VIDEO CODING METHOD, COMPUTER DEVICE, AND STORAGE MEDIUM

(71) Applicant: Tencent Technology (Shenzhen) Company Limited, Shenzhen (CN)

(72) Inventor: Xunan Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/660,294

(22) Filed: Oct. 22, 2019

(65) Prior Publication Data
US 2020/0053356 A1 Feb. 13, 2020

Related U.S. Application Data

(63) Continuation of application No. PCT/CN2018/102071, filed on Aug. 24, 2018.

(30) Foreign Application Priority Data

Nov. 22, 2017 (CN) .......................... 201711176608.X

(51) Int. Cl.
*H04N 19/103* (2014.01)
*H04N 19/124* (2014.01)
(Continued)

(52) U.S. Cl.
CPC ......... *H04N 19/103* (2014.11); *H04N 19/124* (2014.11); *H04N 19/132* (2014.11); *H04N 19/577* (2014.11)

(58) Field of Classification Search
CPC .... H04N 19/176; H04N 19/61; H04N 19/117; H04N 19/124; H04N 19/172;
(Continued)

(56) References Cited

U.S. PATENT DOCUMENTS

2007/0274396 A1* 11/2007 Zhang .................. H04N 19/176
375/240.24
2015/0373367 A1 12/2015 Le Tanou

FOREIGN PATENT DOCUMENTS

CN 103813174 A 5/2014
CN 105959700 A 9/2016
(Continued)

OTHER PUBLICATIONS

Tencent Technology, ISR, PCT/CN2018/102071, Nov. 23, 2018, 2 pgs.
(Continued)

*Primary Examiner* — Farhan Mahmud
(74) *Attorney, Agent, or Firm* — Morgan, Lewis & Bockius LLP

(57) ABSTRACT

This application relates to a video coding method, including: obtaining a current video frame to be coded, and obtaining a predicted residual of a reference video frame of the current video frame in a case that the current video frame is an inter prediction frame; determining a quantization parameter threshold corresponding to the current video frame according to the predicted residual of the reference video frame; obtaining a quantization parameter estimated value corresponding to the current video frame; selecting a target coding mode from candidate coding modes according to the quantization parameter estimated value and the quantization parameter threshold, the candidate coding modes including a down-sampling mode and a full resolution mode; and coding the current video frame according to the target coding mode.

17 Claims, 10 Drawing Sheets

(51) Int. Cl.
 *H04N 19/132* (2014.01)
 *H04N 19/577* (2014.01)
(58) Field of Classification Search
 CPC ...... H04N 19/46; H04N 19/182; H04N 19/52; H04N 19/136; H04N 19/137
 See application file for complete search history.

(56) References Cited

FOREIGN PATENT DOCUMENTS

| | | |
|---|---|---|
| CN | 107040781 A | 8/2017 |
| CN | 107155107 A | 9/2017 |

OTHER PUBLICATIONS

Tencent Technology, WO, PCT/CN2018/102071, Nov. 23, 2018, 4 pgs.
Tencent Technology, IPRP, PCT/CN2018/102071, May 26, 2020, 5 pgs.

\* cited by examiner

VIDEO CODING METHOD, COMPUTER DEVICE, AND STORAGE MEDIUM

CROSS-REFERENCE TO RELATED APPLICATION

This application is a continuation application of PCT/CN2018/102071, entitled "VIDEO CODING METHOD, COMPUTER DEVICE, AND STORAGE MEDIUM" filed on Aug. 24, 2018, which claims priority to China Patent Application No. 201711176608.X, filed with the Chinese Patent Office on Nov. 22, 2017 and entitled "VIDEO CODING METHOD AND APPARATUS, COMPUTER DEVICE, AND STORAGE MEDIUM", both of which are incorporated herein by reference in their entirety.

FIELD OF THE TECHNOLOGY

This application relates to the field of computer processing technologies, and in particular, to a video coding method, a computer device, and a storage medium.

BACKGROUND OF THE DISCLOSURE

Video coding refers converting a file of a specific video format into a file of another video format by using a particular compression technology. Due to the limit of bandwidth, compression coding needs to be performed on a video before the video is uploaded. Compression coding results in a loss in quality. To improve video quality, a hybrid coding scheme is proposed.

In a conventional hybrid coding scheme, a coding mode cannot be selected flexibly, causing a problem of low compression rate.

SUMMARY

According to various embodiments of this application, a video coding method, a computer device, and a storage medium are proposed.

A video coding method, including:

obtaining, by a computer device, a current video frame to be coded, and obtaining a predicted residual of a reference video frame of the current video frame in a case that the current video frame is an inter prediction frame;

determining, by the computer device, a quantization parameter threshold corresponding to the current video frame according to the predicted residual of the reference video frame;

obtaining, by the computer device, a quantization parameter estimated value corresponding to the current video frame;

selecting, by the computer device, a target coding mode from candidate coding modes according to the quantization parameter estimated value and the quantization parameter threshold, the candidate coding modes including a down-sampling mode and a full resolution mode; and coding, by the computer device, the current video frame according to the target coding mode.

A computer device, including a memory and one or more processors, the memory storing computer readable instructions, when executed by the one or more processors, the computer readable instructions enable the one or more processors to perform the following operations:

obtaining a current video frame to be coded, and obtaining a predicted residual of a reference video frame of the current video frame in a case that the current video frame is an inter prediction frame;

determining a quantization parameter threshold corresponding to the current video frame according to the predicted residual of the reference video frame;

obtaining a quantization parameter estimated value corresponding to the current video frame;

selecting a target coding mode from candidate coding modes according to the quantization parameter estimated value and the quantization parameter threshold, the candidate coding modes including a down-sampling mode and a full resolution mode; and coding the current video frame according to the target coding mode.

One or more computer readable non-volatile storage media store computer readable instructions; when executed by one or more processors, the computer readable instructions enable the one or more processors to perform the following operations:

obtaining a current video frame to be coded, and obtaining a predicted residual of a reference video frame of the current video frame in a case that the current video frame is an inter prediction frame;

determining a quantization parameter threshold corresponding to the current video frame according to the predicted residual of the reference video frame;

obtaining a quantization parameter estimated value corresponding to the current video frame;

selecting a target coding mode from candidate coding modes according to the quantization parameter estimated value and the quantization parameter threshold, the candidate coding modes including a down-sampling mode and a full resolution mode; and coding the current video frame according to the target coding mode.

Details of one or more embodiments of this application are proposed in the following accompanying drawings and description. Other features, objectives, and advantages of this application will become evident from the specification, accompanying drawings, and claims.

BRIEF DESCRIPTION OF THE DRAWINGS

To describe the technical solutions in the embodiments of this application or in the prior art more clearly, the following briefly introduces the accompanying drawings required for describing the embodiments or the related technology. Apparently, the accompanying drawings in the following description merely show some embodiments of this application, and a person of ordinary skill in the art may still derive other drawings from these accompanying drawings without creative efforts.

DESCRIPTION OF EMBODIMENTS

To make the objectives, technical solutions and advantages of this application more comprehensible, the following describes this application in detail with reference to the accompanying drawings and embodiments. It is to be appreciated that the embodiments described herein are merely for the illustration of this application, and is not intended to limit this application.

Figure 1:
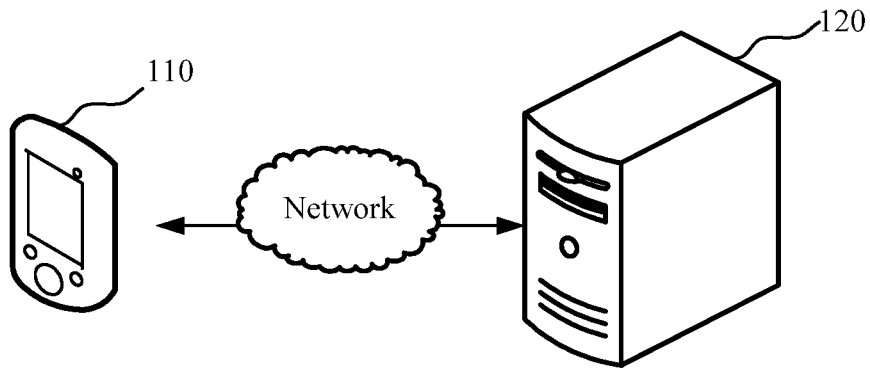
FIG. 1 is a diagram of an application environment of a video coding method in an embodiment.

FIG. 1 is a diagram of an application environment of a video coding method in an embodiment. Referring to FIG. 1, the video coding method is used in a video coding system. The video coding system includes a terminal 110 and a server 120. The terminal 110 and the server 120 are connected through a network. The terminal 110 specifically may be a desktop terminal or a mobile terminal. The mobile terminal specifically may be at least one of a mobile phone, a tablet computer, a notebook computer. The server 120 may be implemented by using an independent server or a server cluster formed by multiple servers. The video coding method may be completed in the terminal 110 or the server 120. That is, the terminal 110 may code a to-be-coded video frame by using the video coding method, and then upload the coded video to the server 120. Alternatively, the to-be-coded video frame may also be coded by using the video coding method in the server 120, and then the coded video is delivered to the terminal 110.

Figure 2:
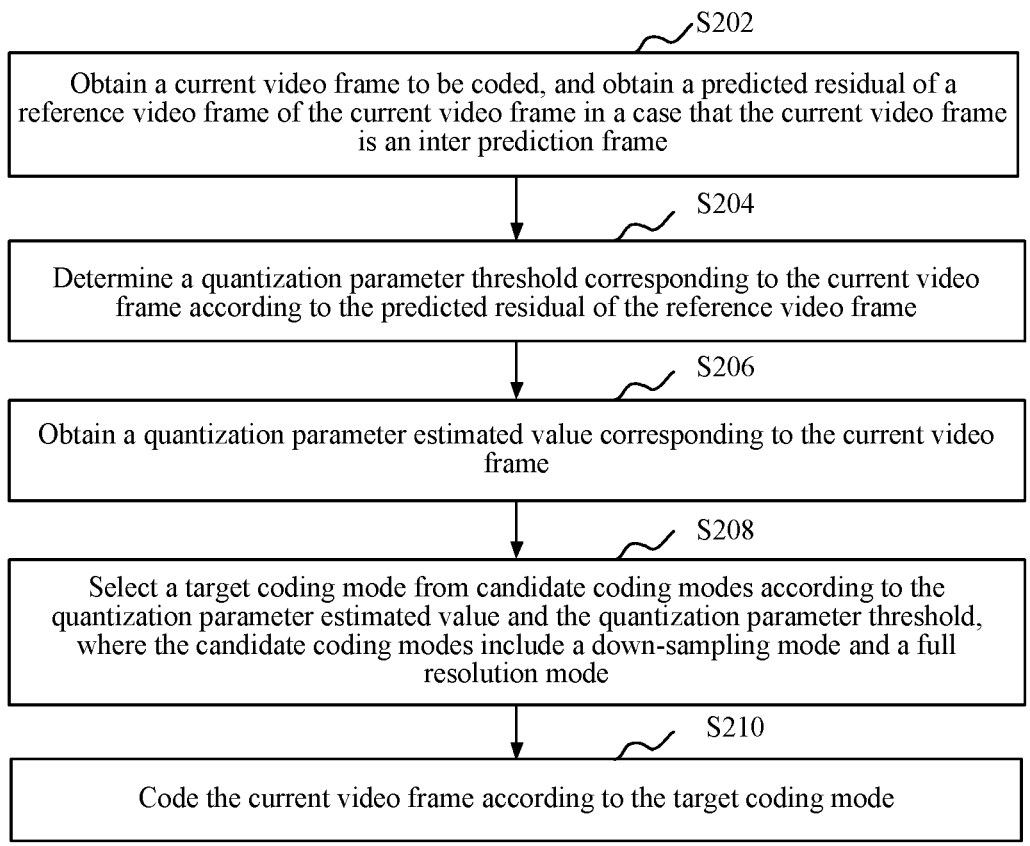
FIG. 2 is a flowchart of a video coding method in an embodiment.

As shown in FIG. 2, in an embodiment, a video coding method is provided. The video coding method may be applied to a computer device. The computer device may be a server or a terminal. This embodiment is mainly described by using an example in which the method is applied to the terminal 110 in FIG. 1. Referring to FIG. 1, the video coding method specifically includes the following steps:

Step S202: Obtain a current video frame to be coded, and obtain a predicted residual of a reference video frame of the current video frame in a case that the current video frame is an inter prediction frame.

In an embodiment, a video is formed by video frames. During coding, each video frame needs to be coded. The current video frame refers to a video frame to be coded currently. The video frames are classified into intra-frame prediction frames (such as I frames) and inter prediction frames (such as P frames and B frames). The intra-frame prediction frame is an independent frame carrying all information without reference to other video frames. The inter prediction frame is not an independent frame, and needs to reference other video frames. For example, a P frame needs to reference a forward video frame; a B frame may reference a forward video frame, or reference a backward video frame. Definitely, a B frame may also reference both a forward video frame and a backward video frame. Referenced video frames are collectively referred to as "reference video frames". The forward video frame refers to a video frame in front of the current video frame. The backward video frame refers to a video frame following the current video frame. In an embodiment, the forward video frame refers to a front video frame within a first preset interval to the current video frame, for example, a previous frame of the current video frame. The backward video frame refers to a rear video frame within a second preset interval to the current video frame, for example, a next frame of the current video frame. In an embodiment, reference video frames of the P frame and the B frame are both forward video frames. In another embodiment, the reference video frame of the P frame is a forward video frame; a forward video frame and a backward video frame are both used as the reference video frames of the B frame. Specifically, a reference video frame corresponding to the current video frame is determined first, and then a predicted residual of the reference video frame is obtained.

In an embodiment, the predicted residual of the reference video frame is obtained by calculating a pixel predicted residual of each pixel and then adding up absolute values of the pixel predicted residuals of all the pixels. The pixel predicted residual equals a difference between an actual pixel value and a predicted pixel value. The actual pixel value refers to an original pixel value of an image. The predicted pixel value refers to a predicted pixel value that corresponds to an original pixel and that is obtained according to an inter prediction or intra-frame prediction algorithm. The reference video frame is a video frame that has been coded before the current video frame. Therefore, the predicted pixel value of the reference video frame is determined during coding of the reference video frame, and during coding of the current video frame, the predicted pixel value and the actual pixel value of the reference video frame are already known. In an embodiment, if the current video frame is an intra-frame prediction frame, for example, an I frame, the current video frame is directly coded by using a full resolution mode.

Step S204: Determine a quantization parameter threshold corresponding to the current video frame according to the predicted residual of the reference video frame.

In an embodiment, the quantization parameter threshold refers to a reference value for measuring a quantization parameter. The predicted residual reflects the intensity of motion of a scene. A greater predicted residual indicates higher intensity of the motion of the current scene, and a smaller predicted residual indicates that the current scene is relatively static.

People are more sensitive to video quality of a static scene, and are insensitive to a fast-moving scene. Therefore, down-sampling coding is preferred for a scene with intense motion; full-resolution coding is preferred for a static scene. When the predicted residual is relatively large, it indicates that motion is relatively intense in the current scene. In this case, down-sampling coding is preferred. Therefore, a relatively small quantization parameter threshold may be set. On the contrary, when the predicted residual is relatively small, a relatively large quantization parameter threshold may be set because in this case, full-resolution coding is preferred. In an embodiment, a correspondence between predicted residuals and quantization parameter thresholds may be preset. After the predicted residual of the reference video frame is obtained, a corresponding quantization parameter threshold can be determined, where the predicted residual is negatively correlated with the quantization parameter threshold. Subsequently, an appropriate target coding mode is selected from candidate coding modes according to a relationship between a quantization parameter estimated value and the quantization parameter threshold of the current video frame, to improve the video compression efficiency while ensuring the video quality. In an embodiment, when the predicted residual is greater than or equal to a predicted residual reference value, a first quantization parameter is used as the quantization parameter threshold, and when the predicted residual is less than the preset predicted residual reference value, a second quantization parameter is used as the quantization parameter threshold, where the first quantization parameter is less than the second quantization parameter. A relationship between the predicted residual and the quantization parameter threshold may be expressed by using the following formula:

$$QP_{TH} = \begin{cases} 33 & \Omega \geq \Omega_{TH} \\ 36 & \Omega < \Omega_{TH} \end{cases},$$

where $QP_{TH}$ represents a quantization parameter threshold, $\Omega$ represents a predicted residual corresponding to a reference video frame, and $\Omega_{TH}$ represents a predicted residual reference value corresponding to a reference video frame.

Step S206: Obtain a quantization parameter estimated value corresponding to the current video frame.

In an embodiment, the quantization parameter (QP) is a parameter for measuring a quantization step, and can affect image quality. A smaller quantization parameter corresponds to better image quality. The quantization parameter is positively correlated with a compression rate. That is, a smaller quantization parameter corresponds to a smaller compression rate, and a greater quantization parameter corresponds to a higher compression rate. To determine which coding mode is used for coding the current video frame, it is necessary to obtain the quantization parameter estimated value corresponding to the current video frame. For different coding schemes, there are different methods for calculating the quantization parameter estimated value corresponding to the current video frame. In an embodiment, when the current coding scheme is fixed-quality coding, a quantization parameter corresponding to the fixed-quality coding is directly used as the quantization parameter estimated value of the current video frame, that is, an external preset value of an encoder is used as the quantization parameter estimated value of the current video frame. Because in the fixed-quality coding scheme, all code units use the same quantization parameter, the preset quantization parameter can be directly used as the quantization parameter estimated value of the current video frame. When the current coding scheme is fixed-bit-rate coding, a quantization parameter of the first code unit of the current video frame is calculated according to an existing bit rate control algorithm of the encoder, and the quantization parameter of the first code unit is the quantization parameter estimated value corresponding to the current video frame. For the fixed-bit-rate coding, different code units in the same video frame correspond to different quantization parameters, and the quantization parameter of the first code unit is used as the quantization parameter estimated value of the video frame, so as to determine which coding mode is used for coding subsequently.

In another embodiment, for the fixed-bit-rate coding, the quantization parameter estimated value of the current video frame is determined according to an average quantization parameter of the forward reference video frame. Specifically, an average quantization parameter of a forward reference video frame is calculated, and then a frame type of the forward reference video frame is obtained. If the forward reference video frame and the current video frame are of the same frame type, the average quantization parameter is directly used as the quantization parameter estimated value of the current video frame. If the forward reference video frame and the current video frame are of different frame types, a frame quantization parameter offset between the two frame types is obtained, and a sum of the average quantization parameter and the frame quantization parameter offset is used as the quantization parameter estimated value corresponding to the current video frame.

Step S208: Select a target coding mode from candidate coding modes according to the quantization parameter estimated value and the quantization parameter threshold, where the candidate coding modes include a down-sampling mode and a full resolution mode.

In an embodiment, the down-sampling mode refers to a mode in which a to-be-coded video frame is down-sampled and then coded. A down-sampling algorithm may be customized as required, including vertical down-sampling, horizontal down-sampling, vertical and horizontal sampling. Down-sampling may be performed by using a direct mean algorithm, a filter algorithm, a bi-cubic interpolation algorithm, a bilinear interpolation algorithm, and the like. The full sampling mode refers to directly coding a to-be-coded video frame. The full resolution mode refers to a mode in which a to-be-coded video frame is directly coded. The quantization parameter threshold is a threshold for measuring a quantization parameter. In an embodiment, the quantization parameter estimated value is compared with the quantization parameter threshold. When the quantization parameter estimated value is greater than the quantization parameter threshold, it indicates that the current video frame does not require high resolution, and the down-sampling mode is selected. On the contrary, when the quantization parameter estimated value is less than the quantization parameter threshold, the full resolution mode is selected.

Step S210: Code the current video frame according to the target coding mode.

In an embodiment, after the target coding mode corresponding to the current video frame is determined, the current video frame is coded by using the target coding mode. Specifically, the reference video frame corresponding to the current video frame is obtained, and it is determined whether the current video frame and the corresponding reference video frame correspond to the same coding mode. If the current video frame and the corresponding reference video frame correspond to the same coding mode, the current video frame is directly coded by using the target coding mode according to a reconstructed image of the reference video frame. If the current video frame and the corresponding reference video frame correspond to different coding modes, the reconstructed image of the reference video frame is sampled (up-sampled or down-sampled) to obtain a target reconstructed image. In an embodiment, if the target coding mode corresponding to the current video frame is the full resolution mode and the reference video frame corresponds to a down-sampling reconstructed image, the down-sampling reconstructed image is up-sampled to obtain a full-resolution reconstructed image as a target reconstructed image. If the target coding mode corresponding to the current video frame is the down-sampling mode and the reference video frame corresponds to a full-resolution reconstructed image, the full-resolution reconstructed image is down-sampled to obtain a down-sampling reconstructed image as a target reconstructed image, and finally, the current video frame is coded according to the target reconstructed image of the reference video frame.

In the foregoing video coding method, a to-be-coded current video frame is obtained; a predicted residual of a reference video frame of the current video frame is obtained in a case that the current video frame is an inter prediction frame; a quantization parameter threshold corresponding to the current video frame is determined according to the predicted residual of the reference video frame; then, a target coding mode is selected from candidate coding modes according to a relationship between the quantization parameter estimated value corresponding to the current video frame and the quantization parameter threshold, where the candidate coding modes include a down-sampling mode and a full resolution mode; finally, the current video frame is coded according to the target coding mode. In the video coding method, it is determined whether the down-sampling mode or the full resolution mode is used according to the relationship between the quantization parameter estimated value and the quantization parameter threshold of the current video frame, so that optimal resolution can be selected for any scenario and any bit rate, thus improving the compression efficiency while ensuring the video quality.

Figure 3:
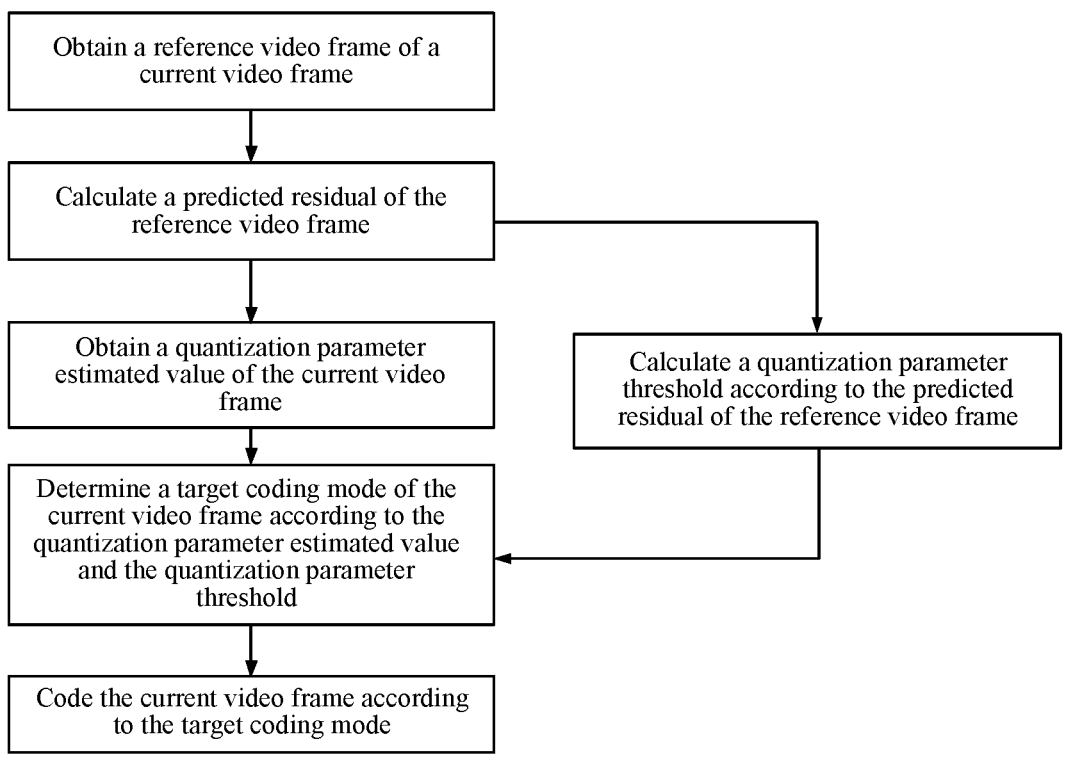
FIG. 3 is a schematic flowchart of a video coding method in an embodiment.

FIG. 3 is a schematic flowchart of a video coding scheme in an embodiment. First, a reference video frame of a current video frame is obtained, and a predicted residual of the reference video frame is calculated. Then, a quantization parameter threshold is calculated according to the predicted residual of the reference video frame. At the same time, a quantization parameter estimated value of the current video frame is obtained, and then a target coding mode (a full resolution mode or a down-sampling mode) of the current video frame is determined according to the quantization parameter estimated value and the quantization parameter threshold. Then, the current video frame is coded according to the target coding mode.

In an embodiment, the step of selecting a target coding mode from candidate coding modes according to the quantization parameter estimated value and the quantization parameter threshold, the candidate coding modes including a down-sampling mode and a full resolution mode includes: using the down-sampling mode as the target coding mode in a case that a difference between the quantization parameter estimated value and the quantization parameter threshold is greater than a preset threshold; otherwise, using the full resolution mode as the target coding mode.

In an embodiment, the candidate coding modes include the down-sampling mode and the full resolution mode. After the quantization parameter estimated value corresponding to the current video frame and the quantization parameter threshold corresponding to the current video frame are obtained, a difference between the quantization parameter estimated value and the quantization parameter threshold is calculated. A preset threshold (such as 0.5) is preconfigured. When the difference between the quantization parameter estimated value and the quantization parameter threshold is greater than the preset threshold, it indicates that the current video frame does not require high resolution, and therefore the down-sampling mode is used as the target coding mode, to further improve the compression efficiency. When the difference between the quantization parameter estimated value and the quantization parameter threshold is not greater than the preset threshold, it indicates that the current video frame requires relatively high resolution, and therefore, the full resolution mode is used as the target coding mode, to effectively ensure the video quality. By comparing the difference between the quantization parameter estimated value and the quantization parameter threshold of the current video frame with the preset threshold and then selecting the target coding mode for coding, the compression efficiency of the video can be improved while ensuring the video quality.

In an embodiment, step S202 of obtaining a predicted residual of a reference video frame of the current video frame includes: obtaining sub-predicted residuals corresponding to pixels of the reference video frame; and collecting statistics on absolute values of the sub-predicted residuals to obtain the predicted residual of the reference video frame.

In an embodiment, to calculate the predicted residual of the reference video frame of the current video frame, predicted residuals of pixels of the reference video frame are obtained first. For ease of distinguishing, a predicted residual corresponding to a pixel is referred to as a "sub-predicted residual." Then, absolute values of the sub-predicted residuals corresponding to the pixels are accumulated to obtain the predicted residual of the reference video frame.

Step S204 of obtaining a quantization parameter threshold corresponding to the current video frame according to the predicted residual of the reference video frame includes: obtaining a quantity of pixels included in the reference video frame; calculating an average predicted residual corresponding to the reference video frame according to the quantity of pixels and the predicted residual; and determining the quantization parameter threshold corresponding to the current video frame according to the average predicted residual.

In an embodiment, to better determine the quantization residual threshold, after the predicted residual of the reference video frame is obtained through calculation, the quantity of pixels included in the reference video frame is obtained; a mean value is calculated according to the predicted residual and the quantity of pixels to obtain the average predicted residual corresponding to the reference video frame. Then, the quantization parameter threshold corresponding to the current video frame is determined according to the average predicted residual. In an embodiment, a correspondence between average predicted residuals and quantization parameter thresholds is preset, where a quantization parameter threshold corresponding to a greater average predicted residual is set to be smaller, that is, the average predicted residual is negatively correlated with the quantization parameter threshold. Because reference video frames may correspond to different coding modes, obtained video frames may also have different sizes. If the quantization parameter threshold is calculated by using a predicted residual corresponding to the whole video frame, the result may be inaccurate in some cases. Therefore, the average predicted residual is used, to reflect the motion intensity of the reference video frame more accurately, thus determining the quantization parameter threshold more accurately.

In an embodiment, in a case that the current video frame is a bi-directional predicted video frame, step S202 of obtaining a predicted residual of a reference video frame of the current video frame: obtaining a forward predicted residual of a forward reference video frame and a backward predicted residual of a backward reference video frame of the current video frame.

In an embodiment, if the current video frame is a bi-directional predicted video frame, for example, a B frame, the corresponding reference video frames include a forward reference video frame and a backward reference video frame. A predicted residual corresponding to the forward reference video frame and a predicted residual corresponding to the backward reference video frame are obtained respectively. For ease of distinguishing, the predicted residual corresponding to the forward reference video frame is referred to as a "forward predicted residual" and the predicted residual corresponding to the backward reference video frame is referred to as a "backward predicted residual."

Step S204 of determining a quantization parameter threshold corresponding to the current video frame according to the predicted residual of the reference video frame includes: obtaining a quantity of forward pixels included in the forward reference video frame and a quantity of backward pixels included in the backward reference video frame; calculating a forward average predicted residual corresponding to the forward reference video frame according to the forward predicted residual and the quantity of forward pixels; calculating a backward average predicted residual corresponding to the backward reference video frame according to the backward predicted residual and the quantity of backward pixels; calculating a mean value according to the forward average predicted residual and the backward average predicted residual to obtain the average predicted residual corresponding to the reference video frame; determining the quantization parameter threshold corresponding to the current video frame according to the average predicted residual.

In an embodiment, after the forward predicted residual corresponding to the forward reference video frame and the backward predicted residual corresponding to the backward reference video frame are obtained through calculation, a quantity of forward pixels included in the forward reference video frame and a quantity of backward pixels included in the backward reference video frame are obtained respectively. Then, the forward average predicted residual and the backward average predicted residual are obtained through calculation respectively. Finally, a mean value is calculated according to the forward average predicted residual and the backward average predicted residual to obtain the average predicted residual corresponding to the reference video frame. The quantization parameter threshold corresponding to the current video frame according to a relationship between the average predicted residual and the quantization parameter threshold.

Figure 4:
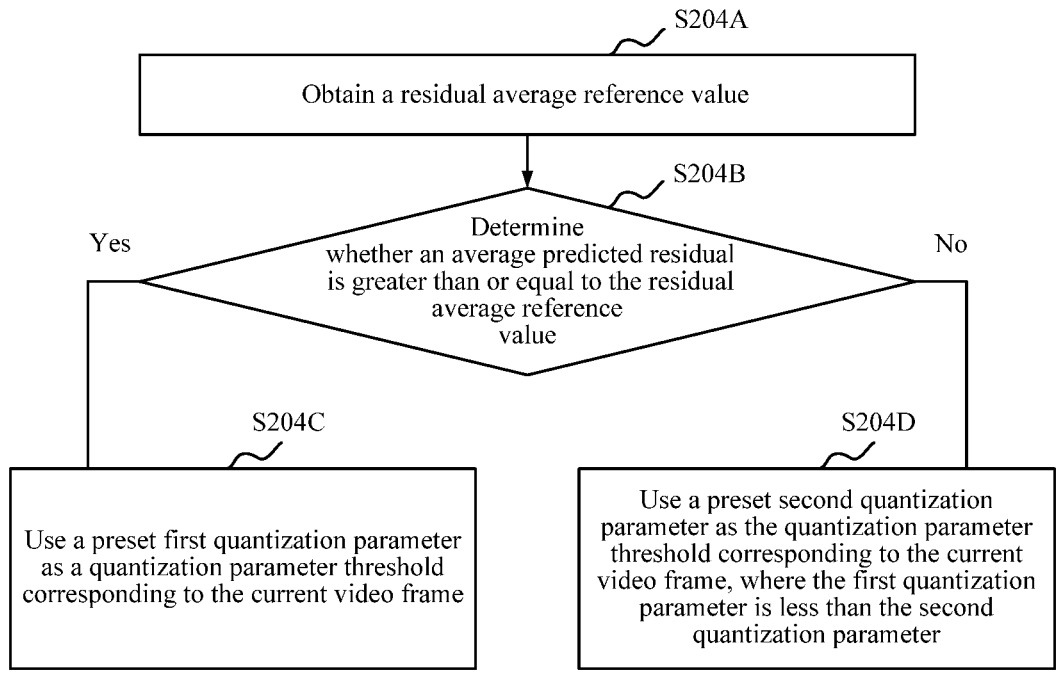
FIG. 4 is a flowchart of a method for determining a quantization parameter threshold in an embodiment.

As shown in FIG. 4, in an embodiment, the step of determining the quantization parameter threshold corresponding to the current video frame according to the average predicted residual includes the following steps:

Step 204A: Obtain a residual average reference value.

Specifically, the residual average reference value refers to a reference value for measuring an average predicted residual. In an embodiment, the residual average reference value may be preset. For example, the residual average reference value is set to 3.5. In another embodiment, the residual average reference value is calculated according to a quantization parameter corresponding to the reference video frame. Specifically, a quantization parameter corresponding to the reference video frame is obtained, and the residual average reference value is determined according to the quantization parameter of the reference video frame, where the quantization parameter of the reference video frame is positively correlated with the residual average reference value.

Step 204B: Determine whether an average predicted residual is greater than or equal to the residual average reference value; if yes, perform step 204C; otherwise, perform step 204D.

Step 204C: Use a preset first quantization parameter as the quantization parameter threshold corresponding to the current video frame.

Step 204D: Use a preset second quantization parameter as the quantization parameter threshold corresponding to the current video frame, where the first quantization parameter is less than the second quantization parameter.

Specifically, the average predicted residual is compared with the residual average reference value. If the average predicted residual is greater than or equal to the residual average reference value, the preset first quantization parameter is used as the quantization parameter threshold corresponding to the current video frame. If the average predicted residual is less than the residual average reference value, the second quantization parameter is used as the quantization parameter threshold corresponding to the current video frame. In an embodiment, the quantization parameter threshold may be expressed by using the following formula:

$$QP_{TH} = \begin{cases} 33 & \overline{MAD} \geq MAD_{TH} \\ 36 & \overline{MAD} < MAD_{TH} \end{cases},$$

where $\overline{MAD}$ represents an average predicted residual corresponding to a reference video frame, and $MAD_{TH}$ represents a residual average reference value.

Figure 5:
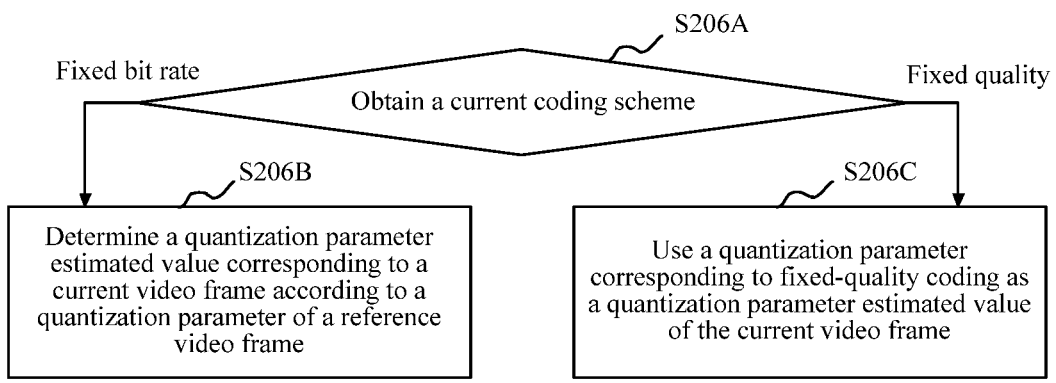
FIG. 5 is a flowchart of a method for obtaining a quantization parameter estimated value in an embodiment.

As shown in FIG. 5, in an embodiment, step S206 of obtaining a quantization parameter estimated value corresponding to the current video frame includes:

Step S206A: Obtain a current coding scheme; perform step S206B in a case that the current coding scheme is fixed-bit-rate coding; perform step S206C in a case that the current coding scheme is fixed-quality coding.

In an embodiment, the current coding scheme refers to a coding scheme used during current coding. Coding schemes include fixed-bit-rate coding and fixed-quality coding. Fixed-bit-rate coding refers to a coding scheme in which a bit rate is fixed and a quantization parameter needs to be adjusted constantly to adapt to the bit rate. Fixed-quality coding refers to a scheme of coding a video frame by using the same quantization parameter.

Step S206B: Determine the quantization parameter estimated value corresponding to the current video frame according to a quantization parameter of the reference video frame.

In an embodiment, if the current coding scheme is fixed-bit-rate coding, the quantization parameter of the reference video frame is obtained, and the quantization parameter estimated value corresponding to the current video frame is determined according to the quantization parameter of the reference video frame.

Step S206C: Use a quantization parameter corresponding to fixed-quality coding as the quantization parameter estimated value of the current video frame.

In an embodiment, if the current coding scheme is fixed-quality coding, a quantization parameter that is set in fixed-quality coding is used as the quantization parameter estimated value of the current video frame.

Figure 6:
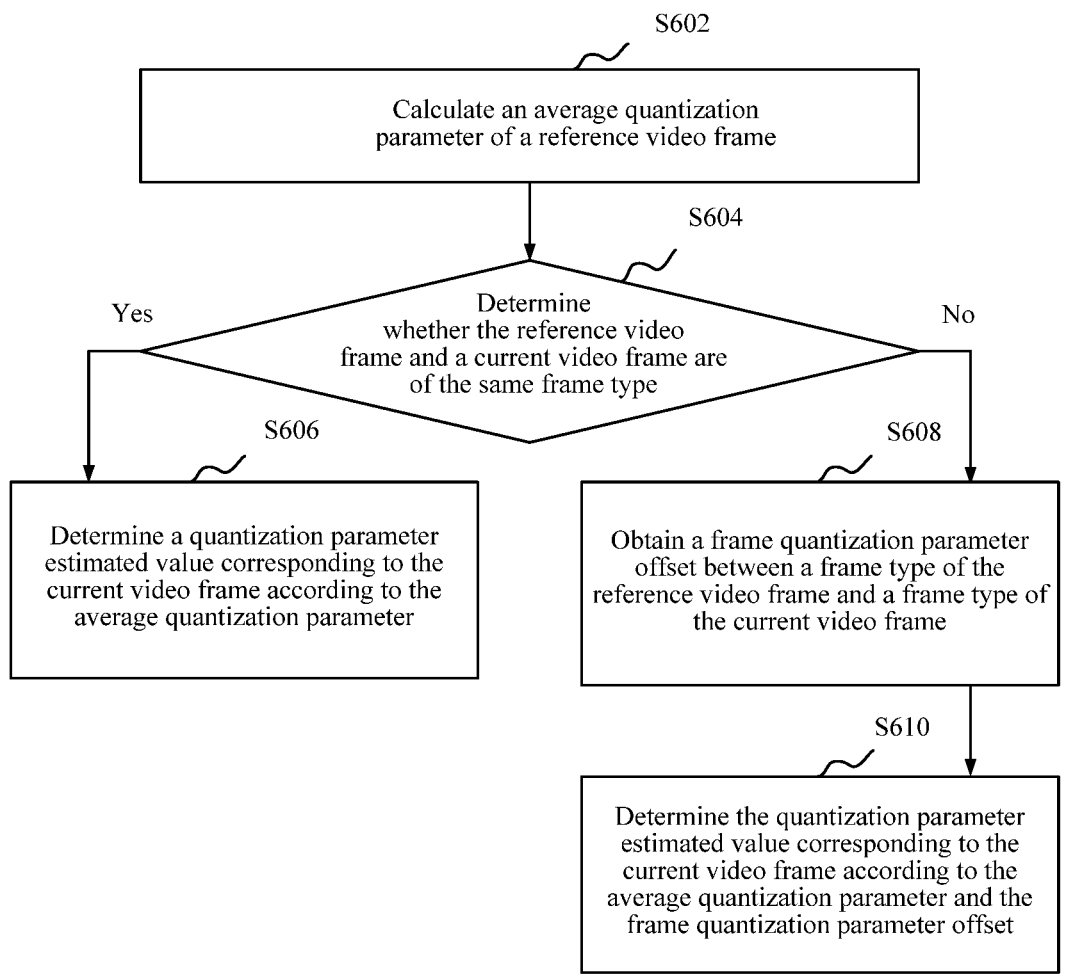
FIG. 6 is a flowchart of a method for determining a quantization parameter estimated value in an embodiment.

As shown in FIG. 6, in an embodiment, step S206B of determining the quantization parameter estimated value corresponding to the current video frame according to a quantization parameter of the reference video frame includes:

Step S602: Calculate an average quantization parameter of the reference video frame.

Specifically, quantization parameters corresponding to all code units in the reference video frame are obtained, and then a mean value of the quantization parameters corresponding to the code units is calculated to obtain the average quantization parameter of the reference video frame. Because quantization parameters used by adjacent video frames are usually close to each other or the same, the average quantization parameter of the reference video frames may be used as the quantization parameter estimated value of the current video frame.

Step S604: Determine whether the reference video frame and the current video frame are of the same frame type; if yes, perform step S606; otherwise, perform step S608.

In an embodiment, quantization parameters corresponding to different frame types are usually different. For example, a quantization parameter of an I frame is lower than a quantization parameter of a P frame. Therefore, a quantization parameter offset between different frame types needs to be preset. For example, there are three frame types: P frame, I frame, and B frame; a frame quantization parameter offset between the P frame and the I frame, a frame quantization parameter offset between the P frame and the B frame, a frame quantization parameter offset between the I frame and the B frame, a frame quantization parameter offset between the I frame and the P frame, a frame quantization parameter offset between the B frame and the P frame, and a frame quantization parameter offset between the B frame and the I frame need to be preset, where the frame quantization parameter offset between the P frame and the I frame is exactly opposite to the frame quantization parameter offset between the I frame and the P frame, and the rest can be obtained by analogy. For example, assuming that the offset between the P frame and the I frame is −2, the frame quantization parameter offset between the I frame and the P frame is 2.

Step S606: Determine the quantization parameter estimated value corresponding to the current video frame according to the average quantization parameter.

In an embodiment, if the reference video frame and the current video frame are of the same frame type, the quantization parameter estimated value corresponding to the current video frame is directly determined according to the average quantization parameter. In an embodiment, the average quantization parameter is directly used as the quantization parameter estimated value corresponding to the current video frame. In another embodiment, the average quantization parameter may be added with a preset additional value (such as 1) to obtain the quantization parameter estimated value.

Step S608: Obtain a frame quantization parameter offset between a frame type of the reference video frame and a frame type of the current video frame.

In an embodiment, if the reference video frame and the current video frame are of different frame types, the frame type of the reference video frame and the frame type of the current video frame are obtained respectively, and the corresponding frame quantization parameter offset is determined according to the two frame types. For example, if the reference video frame is an I frame and the current video frame is a P frame, the frame quantization parameter offset between the I frame and the P frame needs to be obtained.

Step S610: Determine the quantization parameter estimated value corresponding to the current video frame according to the average quantization parameter and the frame quantization parameter offset.

In an embodiment, after the average quantization parameter and the frame quantization parameter offset are determined, the quantization parameter estimated value corresponding to the current video frame is determined according to the average quantization parameter and the frame quantization parameter offset. In an embodiment, a sum of the average quantization parameter and the frame quantization parameter offset is used as the quantization parameter estimated value. By setting a frame quantization parameter offset between different frame types, the compression efficiency can be better improved while ensuring the quality. For example, if the reference video frame is an I frame and the current video frame is a P frame, a quantization parameter offset between the I frame and the P frame is 2. The I frame is an independent frame that has a relatively high requirement on coding quality, the corresponding quantization parameter is relatively low, and the quantization parameter is positively correlated with the compression rate. Therefore, the offset 2 is added to improve the quantization parameter of the P frame, thus improving the compression efficiency.

Figure 7:
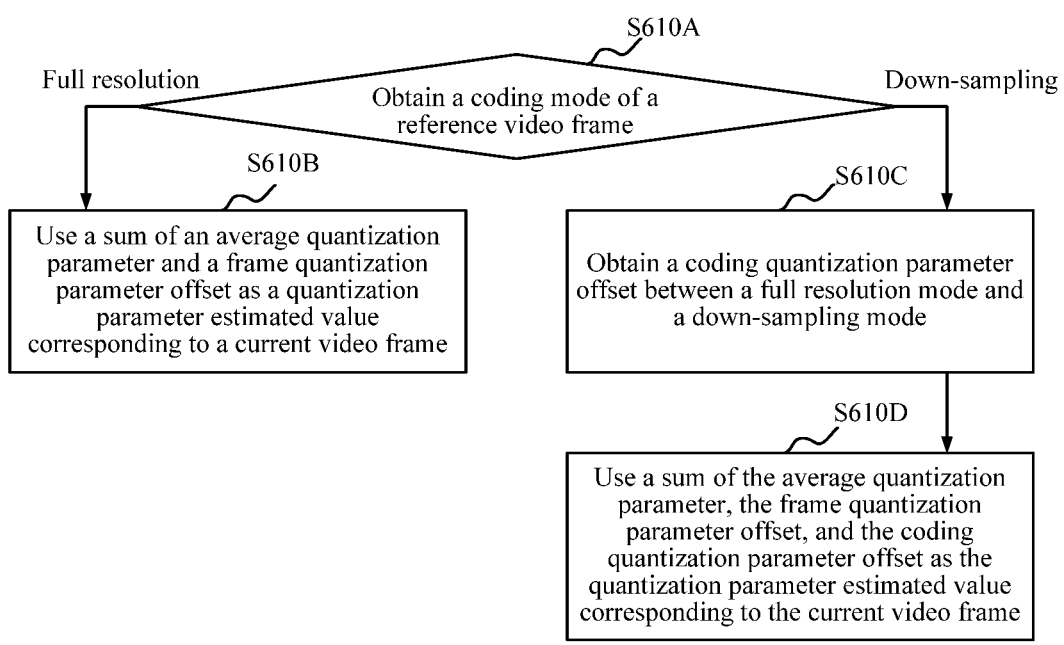
FIG. 7 is a flowchart of a method for determining a quantization parameter estimated value in another embodiment.

As shown in FIG. 7, in an embodiment, step S610 of determining the quantization parameter estimated value corresponding to the current video frame according to the average quantization parameter and the frame quantization parameter offset includes the following steps:

Step S610A: Obtain a coding mode of the reference video frame; perform step S610B in a case that the coding mode of the reference video frame is a full resolution mode; perform step S610B in a case that the coding mode of the reference video frame is a down-sampling mode.

In an embodiment, the reference video frame refers to a coded frame, and therefore has a corresponding coding mode. If the coding mode of the reference video frame is the full resolution mode, the quantization parameter estimated value corresponding to the current video frame can be directly calculated according to the average quantization parameter and the frame quantization parameter offset. If the coding mode of the reference video frame is the down-sampling mode, to make subjective quality stable during switching between down-sampling coding and full-resolution coding, an offset, that is, a coding quantization parameter offset QPdelta, between down-sampling coding and full-resolution coding needs to be set, where QPdelta is greater than 0, a down-sampling coding quantization parameter is obtained by subtracting the coding quantization parameter offset QPdelta from a full-resolution quantization parameter. Because the down-sampling process itself causes a quality loss, the quantization parameter is decreased by an appropriate degree in the case of down-sampling, to improve the quality stability.

Step S610B: Use a sum of the average quantization parameter and the frame quantization parameter offset as the quantization parameter estimated value corresponding to the current video frame.

In an embodiment, if the coding mode of the reference video frame is the full resolution mode, the sum of the average quantization parameter and the frame quantization parameter offset can be directly used as the quantization parameter corresponding to the current video frame.

Step S610C: Obtain a coding quantization parameter offset between the full resolution mode and the down-sampling mode.

In an embodiment, a coding quantization parameter offset QPdelta between the full resolution mode and the down-sampling mode is preset. If the coding mode of the reference video frame is the down-sampling mode, the coding quantization parameter offset between the full resolution mode and the down-sampling mode further needs to be obtained. The quantization parameter estimated value to be calculated is an assumed quantization parameter estimated value corresponding to the full resolution mode. Therefore, if the coding mode of the reference video frame is the down-sampling mode, the quantization parameter estimated value needs to be converted into the quantization parameter estimated value corresponding to the full resolution mode.

Step S610D: Use a sum of the average quantization parameter, the frame quantization parameter offset, and the coding quantization parameter offset as the quantization parameter estimated value corresponding to the current video frame.

In an embodiment, after the coding quantization parameter offset between the full resolution mode and the down-sampling mode is obtained, the sum of the average quantization parameter, the frame quantization parameter offset, and the coding quantization parameter offset is used as the quantization parameter estimated value corresponding to the current video frame.

Figure 8:
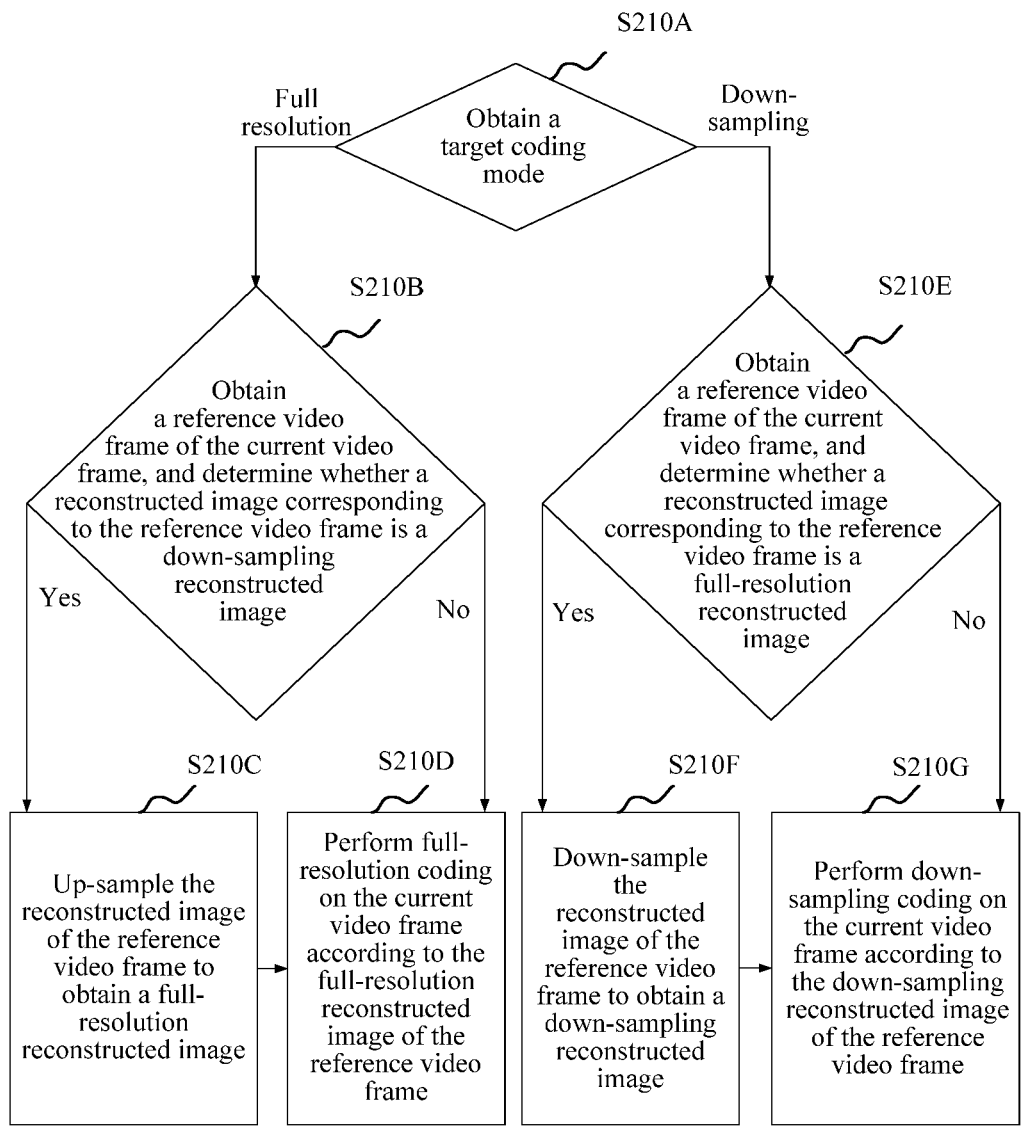
FIG. 8 is a flowchart of a method for coding a current video frame in an embodiment.

As shown in FIG. 8, in an embodiment, step S210 of coding the current video frame according to the target coding mode includes the following steps:

Step S210A: Obtain the target coding mode; perform step S210B in a case that the target coding mode is the full resolution mode; perform step S210E in a case that the target coding mode is the down-sampling mode.

In an embodiment, the target coding mode is the finally determined coding mode corresponding to the current video frame. During coding of an inter prediction frame, a reference video frame is needed. Therefore, the reference video frame of the current video frame further needs to be obtained.

Step S210B: Obtain the reference video frame of the current video frame, and determine whether a reconstructed image corresponding to the reference video frame is a down-sampling reconstructed image; if yes, perform step S210C; otherwise, perform step S210D.

In an embodiment, the reconstructed image refers to an image obtained after a video frame is coded. After the reference video frame of the current video frame is obtained, it is further necessary to determine whether the reconstructed image corresponding to the reference video frame is a down-sampling reconstructed image. The down-sampling reconstructed image refers to a reconstructed image obtained through coding in the down-sampling mode. Because the current video frame corresponds to the full resolution mode, a full-resolution reconstructed image of the reference video frame needs to be obtained. If the reconstructed image corresponding to the reference video frame is a full-resolution reconstructed image, full-resolution coding may be directly performed on the current video frame according to the full-resolution reconstructed image of the reference video frame, and a decoder is informed by using a bit stream that the current frame uses full-resolution coding, so that a corresponding full-resolution decoding mode is used for decoding subsequently.

Step S210C: Up-sample the reconstructed image of the reference video frame to obtain a full-resolution reconstructed image.

Specifically, up-sampling is performed to obtain the full-resolution reconstructed image if the reconstructed image of the reference video frame is a down-sampling reconstructed image.

Step 210D: Perform full-resolution coding on the current video frame according to the full-resolution reconstructed image of the reference video frame.

Specifically, after the full-resolution reconstructed image of the reference video frame is obtained, full-resolution coding is performed on the current video frame according to the full-resolution reconstructed image.

Step S210E: Obtain the reference video frame of the current video frame, and determine whether a reconstructed image corresponding to the reference video frame is a full-resolution reconstructed image; if yes, perform step S210F; otherwise, perform step S210G.

In an embodiment, the full-resolution reconstructed image refers to a reconstructed image obtained through coding in a full resolution mode. When it is determined that the current video frame is a down-sampling mode, a down-sampling reconstructed image corresponding to the reference frame needs to be obtained. If the reconstructed image corresponding to the reference video frame is a full-resolution reconstructed image, the reconstructed image needs to be down-sampled to obtain a down-sampling reconstructed image.

Step S210F: Down-sample the reconstructed image of the reference video frame to obtain a down-sampling reconstructed image.

Specifically, if the reconstructed image of the reference video frame is a full-resolution reconstructed image, the reconstructed image needs to be down-sampled to obtain a down-sampling reconstructed image, for reference to the current video frame.

Step S210G: Perform down-sampling coding on the current video frame according to the down-sampling reconstructed image of the reference video frame.

Specifically, after the down-sampling reconstructed image of the reference video frame is obtained, down-sampling coding is performed on the current video frame according to the down-sampling reconstructed image. Specifically, first, down-sampling is performed on an original image of the current video frame to obtain a down-sampling image, and then coding is performed. In an embodiment, if the width or height of the image obtained through down-sampling is not an integer multiple of 16, sides of the image need to be extended, so that the width and height are both integer multiples of 16.

Figure 9:
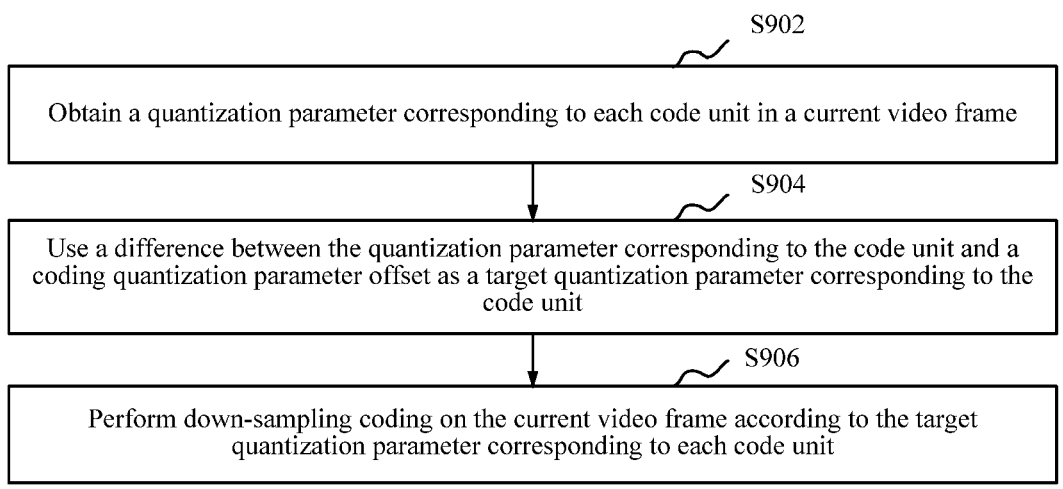
FIG. 9 is a flowchart of a method for performing down-sampling coding on a current video frame in an embodiment.

As shown in FIG. 9, in an embodiment, step S210G of performing down-sampling coding on the current video frame according to the down-sampling reconstructed image of the reference video frame includes the following steps:

Step S902: Obtain a quantization parameter corresponding to each code unit in the current video frame.

In an embodiment, code units are units forming a video frame. The code unit may be a code block in a video frame, or may be a code strip in a video frame. The code strip includes multiple code blocks. The code blocks in the code strip correspond to the same quantization parameter. The code strip can be regarded as one code unit, and corresponds to one quantization parameter. To code a video frame, the quantization parameter corresponding to each code unit needs to be obtained first. In the fixed-quality coding mode, all quantization parameters are the same, and a preset quantization parameter is directly obtained as the quantization parameter of each code unit. In the fixed-bit-rate coding mode, the quantization parameter of each code unit needs to be calculated according to a bit control algorithm Step S904: Use a difference between the quantization parameter corresponding to the code unit and the coding quantization parameter offset as a target quantization parameter corresponding to the code unit.

In an embodiment, the obtained quantization parameter is a quantization parameter obtained through calculation in the full resolution mode by default. Therefore, if the current video frame is coded in the down-sampling mode, the coding quantization parameter offset between the full resolution mode and the down-sampling mode further needs to be obtained, and the coding quantization parameter offset is subtracted from the quantization parameter corresponding to each code unit to obtain the target quantization parameter. That is, to maintain the stability of subjective quality during switching between coding in the full resolution mode and coding in the down-sampling mode, the quantization parameter in the down-sampling mode is decreased appropriately.

Step S906: Perform down-sampling coding on the current video frame according to the target quantization parameter corresponding to each code unit.

In an embodiment, after the target quantization parameter corresponding to each code unit is obtained, down-sampling coding is performed on the current video frame by using the target quantization parameter.

Figure 10:
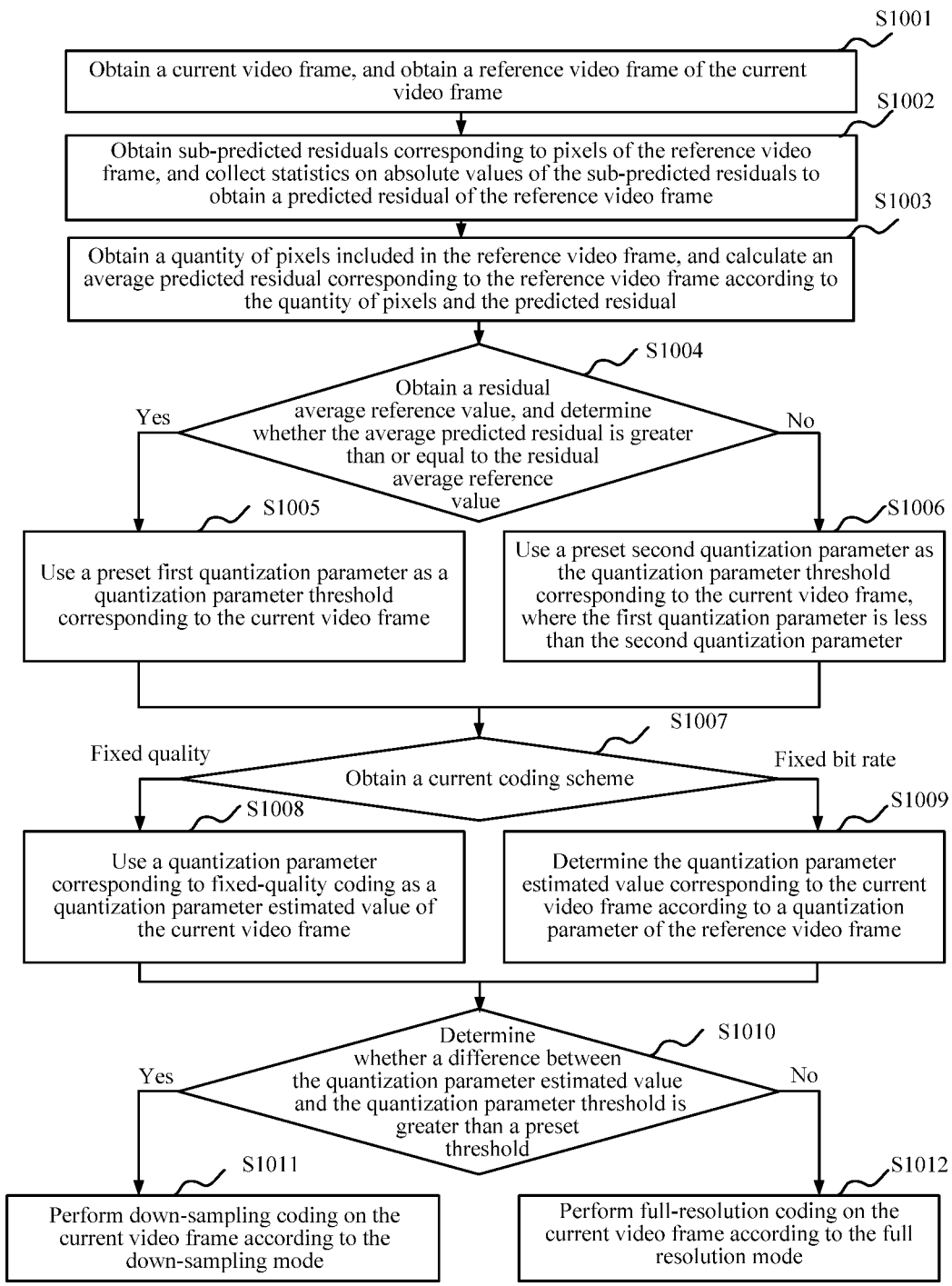
FIG. 10 is a flowchart of a video coding method in another embodiment.

As shown in FIG. 10, in an embodiment, a video coding method is proposed. The method includes the following steps:

Step S1001: Obtain a current video frame, and obtain a reference video frame of the current video frame.

Step S1002: Obtain sub-predicted residuals corresponding to pixels of the reference video frame, and collect statistics on absolute values of the sub-predicted residuals to obtain a predicted residual of the reference video frame.

Step S1003: Obtain a quantity of pixels included in the reference video frame, and calculate an average predicted residual corresponding to the reference video frame according to the quantity of pixels and the predicted residual.

Step S1004: Obtain a residual average reference value, and determine whether the average predicted residual is greater than or equal to the residual average reference value; if yes, perform step S1005; otherwise, perform step S1006.

Step S1005: Use a preset first quantization parameter as a quantization parameter threshold corresponding to the current video frame.

Step S1006: Use a preset second quantization parameter as the quantization parameter threshold corresponding to the current video frame, where the first quantization parameter is less than the second quantization parameter.

Step S1007: Obtain a current coding scheme, perform step S1008 if the current coding scheme is fixed-quality coding, and perform step S1009 if the current coding scheme is fixed-bit-rate coding.

Step S1008: Use a quantization parameter corresponding to fixed-quality coding as a quantization parameter estimated value of the current video frame.

Step S1009: Determine the quantization parameter estimated value corresponding to the current video frame according to a quantization parameter of the reference video frame.

Step S1010: Determine whether a difference between the quantization parameter estimated value and the quantization parameter threshold is greater than a preset threshold; if yes, use a down-sampling mode as a target coding mode, and perform step 1011; otherwise, use a full resolution mode as the target coding mode, and perform step 1012.

Step S1011: Perform down-sampling coding on the current video frame according to the down-sampling mode.

Step S1012: Perform full-resolution coding on the current video frame according to the full resolution mode.

Although the steps in the foregoing flowcharts are displayed sequentially according to the indication of arrows, the steps are not necessarily performed according to the sequence indicated by the arrows. Unless otherwise specified herein, execution of the steps is not limited to a strict sequence, and the steps may be performed in another sequence. Moreover, at least some of the steps may include multiple sub-steps or stages. The sub-steps or stages are not necessarily completed at the same moment, but may be performed at different moments. The sub-steps or stages are not necessarily performed sequentially, but may be performed in turn or alternately with at least some of sub-steps or stages of other steps.

Figure 11:
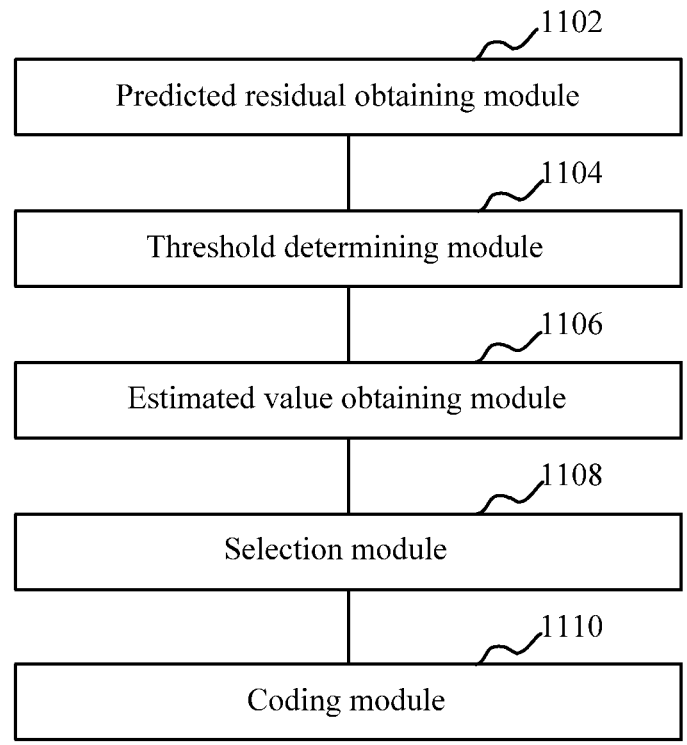
FIG. 11 is a structural block diagram of a video coding apparatus in an embodiment.

As shown in FIG. 11, in an embodiment, a video coding apparatus is proposed. The apparatus includes:

a predicted residual obtaining module 1102, configured to obtain a current video frame to be coded, and obtain a predicted residual of a reference video frame of the current video frame in a case that the current video frame is an inter prediction frame;

a threshold determining module 1104, configured to determine a quantization parameter threshold corresponding to the current video frame according to the predicted residual of the reference video frame;

an estimated value obtaining module 1106, configured to obtain a quantization parameter estimated value corresponding to the current video frame;

a selection module 1108, configured to select a target coding mode from candidate coding modes according to the quantization parameter estimated value and the quantization parameter threshold, the candidate coding modes including a down-sampling mode and a full resolution mode; and a coding module 1110, configured to code the current video frame according to the target coding mode.

In an embodiment, the selection module is further configured to use the down-sampling mode as the target coding mode in a case that a difference between the quantization parameter estimated value and the quantization parameter threshold is greater than a preset threshold; otherwise, use the full resolution mode as the target coding mode.

In an embodiment, the predicted residual obtaining module is further configured to obtain sub-predicted residuals corresponding to pixels of the reference video frame, and collect statistics on absolute values of the sub-predicted residuals to obtain the predicted residual of the reference video frame. The threshold determining module is further configured to obtain a quantity of pixels included in the reference video frame; calculate an average predicted residual corresponding to the reference video frame according to the quantity of pixels and the predicted residual; and determine the quantization parameter threshold corresponding to the current video frame according to the average predicted residual.

In an embodiment, in a case that the current video frame is a bi-directional predicted video frame, the predicted residual obtaining module is further configured to obtain a forward predicted residual of a forward reference video frame and a backward predicted residual of a backward reference video frame of the current video frame. The threshold determining module is further configured to obtain a quantity of forward pixels included in the forward reference video frame and a quantity of backward pixels included in the backward reference video frame; calculate a forward average predicted residual corresponding to the forward reference video frame according to the forward predicted residual and the quantity of forward pixels; calculate a backward average predicted residual corresponding to the backward reference video frame according to the backward predicted residual and the quantity of backward pixels; calculate a mean value according to the forward average predicted residual and the backward average predicted residual to obtain the average predicted residual corresponding to the reference video frame; and determine the quantization parameter threshold corresponding to the current video frame according to the average predicted residual.

In an embodiment, the threshold determining module is further configured to obtain a residual average reference value; use a preset first quantization parameter as the quantization parameter threshold corresponding to the current video frame in a case that the average predicted residual is greater than or equal to the residual average reference value; and use a preset second quantization parameter as the quantization parameter threshold corresponding to the current video frame in a case that the average predicted residual is less than the residual average reference value, the first quantization parameter being less than the second quantization parameter.

Figure 12:
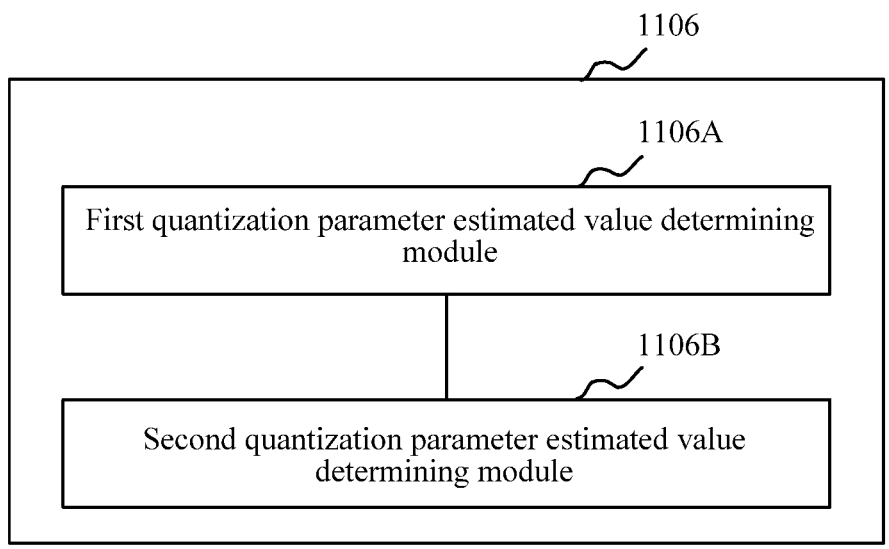
FIG. 12 is a structural block diagram of an estimated value obtaining module in an embodiment.

As shown in FIG. 12, in an embodiment, the estimated value obtaining module 1106 includes:

a first quantization parameter estimated value determining module 1106A, configured to obtain a current coding scheme, and determine the quantization parameter estimated value corresponding to the current video frame according to a quantization parameter of the reference video frame in a case that the current coding scheme is fixed-bit-rate coding; and a second quantization parameter estimated value determining module 1106B, configured to use a quantization parameter corresponding to fixed-quality coding as the quantization parameter estimated value of the current video frame in a case that the current coding scheme is fixed-quality coding.

In an embodiment, the first quantization parameter estimated value is further configured to calculate an average quantization parameter of the reference video frame; obtain a frame quantization parameter offset between a frame type of the reference video frame and a frame type of the current video frame in a case that the reference video frame and the current video frame are of different frame types; and determine the quantization parameter estimated value corresponding to the current video frame according to the average quantization parameter and the frame quantization parameter offset.

In an embodiment, the first quantization parameter estimated value is further configured to obtain a coding quantization parameter offset between the full resolution mode and the down-sampling mode in a case that a coding mode of the reference video frame is the down-sampling mode; and use a sum of the average quantization parameter, the frame quantization parameter offset, and the coding quantization parameter offset as the quantization parameter estimated value corresponding to the current video frame.

Figure 13:
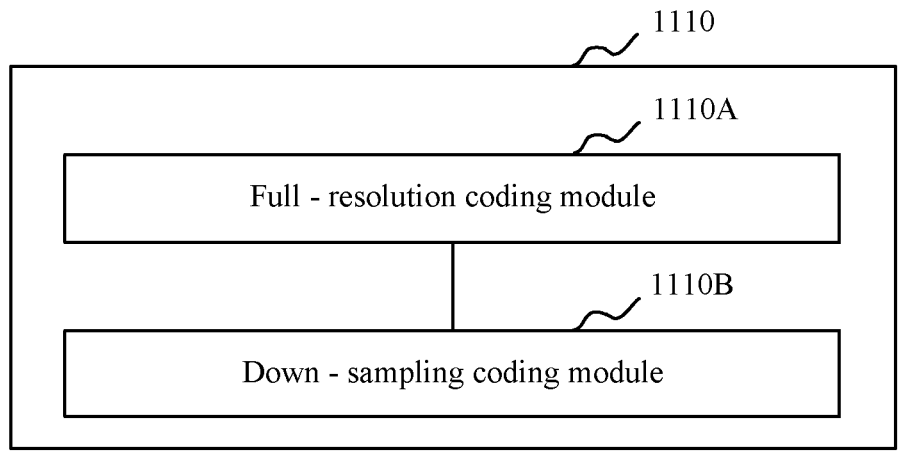
FIG. 13 is a structural block diagram of a coding module in an embodiment.

As shown in FIG. 13, in an embodiment, the coding module 1110 includes:

a full-resolution coding module 1110A, configured to obtain the reference video frame of the current video frame in a case that the target coding mode is the full resolution mode, perform up-sampling on a reconstructed image of the reference video frame to obtain a full-resolution reconstructed image in a case that the reconstructed image corresponding to the reference video frame is a down-sampling reconstructed image, and perform full-resolution coding on the current video frame according to a full-resolution reconstructed image of the reference video frame;

a down-sampling coding module 1110B, configured to obtain the reference video frame of the current video frame in a case that the target coding mode is the down-sampling mode, perform down-sampling on the reconstructed image of the reference video frame to obtain a down-sampling reconstructed image in a case that the reconstructed image corresponding to the reference video frame is a full-resolution reconstructed image, and perform down-sampling coding on the current video frame according to the down-sampling reconstructed image of the reference video frame.

In an embodiment, the down-sampling coding module 1110B is further configured to obtain a quantization parameter corresponding to each code unit in the current video frame; use a difference between the quantization parameter corresponding to the code unit and the coding quantization parameter offset as a target quantization parameter corresponding to the code unit; and perform down-sampling coding on the current video frame according to the target quantization parameter corresponding to each code unit.

Figure 14:
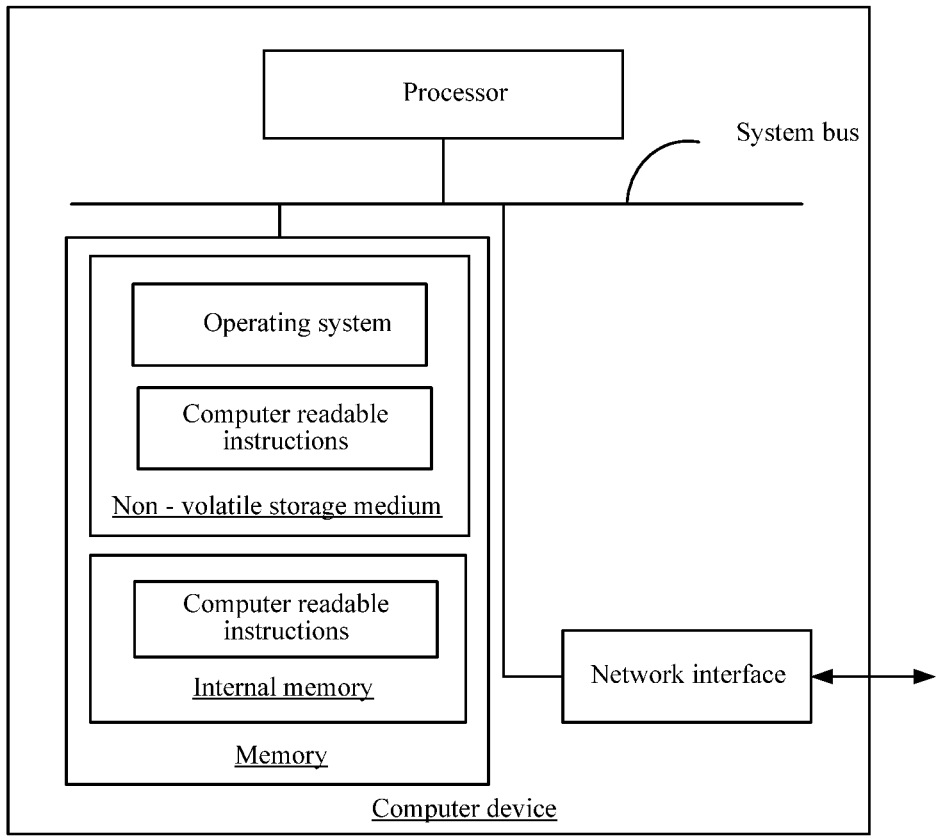
FIG. 14 is a structural block diagram of a computer device in an embodiment.

FIG. 14 is a diagram of an internal structure of a computer device in an embodiment. The computer device specifically may be the terminal 110 or the server 120 in FIG. 1. As shown in FIG. 14, the computer device includes a processor, a memory, and a network interface that are connected through a system bus. The memory includes a non-volatile storage medium and an internal memory. The non-volatile storage medium of the computer device stores an operating system, and may further store computer readable instructions. When executed by the processor, the computer readable instructions can cause the processor to implement the video coding method. The internal memory may also store computer readable instructions. When executed by the processor, the computer readable instructions can cause the processor to implement the video coding method. It can be appreciated by a person skilled in the art that, the structure shown in FIG. 14 is merely a block diagram of a partial structure related to the solution of this application, and does not limit a computer device applied to which the solution of this application is applied. A specific computer device may include more or fewer components than those shown in the figure, or some components may be combined, or a different component deployment may be used.

In an embodiment, the video coding apparatus provided in this application may be implemented in a form of computer readable instructions. The computer readable instructions may be run on the computer device shown in FIG. 14. The memory in the computer device may store various program modules forming the video coding apparatus, for example, the predicted residual obtaining module 1102, the threshold determining module 1104, the estimated value obtaining module 1106, the selection module 1108, and the coding module 1110. Computer readable instructions formed by the program modules cause a processor to perform the steps in the video coding methods in the embodiments of this application described in the specification. For example, the computer device shown in FIG. 14 may obtain, by using the predicted residual obtaining module 1102 in the video coding apparatus shown in FIG. 11, a current video frame to be coded, and obtain a predicted residual of a reference video frame of the current video frame in a case that the current video frame is an inter prediction frame; determine, by using the threshold determining module 1104, a quantization parameter threshold corresponding to the current video frame according to the predicted residual of the reference video frame; obtain, by using the estimated value obtaining module 1106, a quantization parameter estimated value corresponding to the current video frame; select, by using the selection module 1108, a target coding mode from candidate coding modes according to the quantization parameter estimated value and the quantization parameter threshold, the candidate coding modes including a down-sampling mode and a full resolution mode; and code, by using the coding module 1110, the current video frame according to the target coding mode.

In an embodiment, a computer device is proposed. The computer device includes a memory and one or more processors. The memory stores computer readable instructions. When executed by the one or more processors, the computer readable instructions cause the one or more processors to perform the following steps: obtaining a current video frame to be coded, and obtaining a predicted residual of a reference video frame of the current video frame in a case that the current video frame is an inter prediction frame; determining a quantization parameter threshold corresponding to the current video frame according to the predicted residual of the reference video frame; obtaining a quantization parameter estimated value corresponding to the current video frame; selecting a target coding mode from candidate coding modes according to the quantization parameter estimated value and the quantization parameter threshold, the candidate coding modes including a down-sampling mode and a full resolution mode; and coding the current video frame according to the target coding mode.

In an embodiment, the step of selecting a target coding mode from candidate coding modes according to the quantization parameter estimated value and the quantization parameter threshold, the candidate coding modes including a down-sampling mode and a full resolution mode includes: using the down-sampling mode as the target coding mode in a case that a difference between the quantization parameter estimated value and the quantization parameter threshold is greater than a preset threshold; otherwise, using the full resolution mode as the target coding mode.

In an embodiment, the step of obtaining a predicted residual of a reference video frame of the current video frame includes: obtaining sub-predicted residuals corresponding to pixels of the reference video frame; and collecting statistics on absolute values of the sub-predicted residuals to obtain the predicted residual of the reference video frame. The step of determining a quantization parameter threshold corresponding to the current video frame according to the predicted residual of the reference video frame includes: obtaining a quantity of pixels included in the reference video frame; calculating an average predicted residual corresponding to the reference video frame according to the quantity of pixels and the predicted residual; and determining the quantization parameter threshold corresponding to the current video frame according to the average predicted residual.

In an embodiment, in a case that the current video frame is a bi-directional predicted video frame, the step of obtaining a predicted residual of a reference video frame of the current video frame includes: obtaining a forward predicted residual of a forward reference video frame and a backward predicted residual of a backward reference video frame of the current video frame. The step of determining a quantization parameter threshold corresponding to the current video frame according to the predicted residual of the reference video frame includes: obtaining a quantity of forward pixels included in the forward reference video frame and a quantity of backward pixels included in the backward reference video frame; calculating a forward average predicted residual corresponding to the forward reference video frame according to the forward predicted residual and the quantity of forward pixels; calculating a backward average predicted residual corresponding to the backward reference video frame according to the backward predicted residual and the quantity of backward pixels; calculating a mean value according to the forward average predicted residual and the backward average predicted residual to obtain the average predicted residual corresponding to the reference video frame; and determining the quantization parameter threshold corresponding to the current video frame according to the average predicted residual.

In an embodiment, the step of determining the quantization parameter threshold corresponding to the current video frame according to the average predicted residual includes: obtaining a residual average reference value; using a preset first quantization parameter as the quantization parameter threshold corresponding to the current video frame in a case that the average predicted residual is greater than or equal to the residual average reference value; and using a preset second quantization parameter as the quantization parameter threshold corresponding to the current video frame in a case that the average predicted residual is less than the residual average reference value, the first quantization parameter being less than the second quantization parameter.

In an embodiment, the step of obtaining a quantization parameter estimated value corresponding to the current video frame includes: obtaining a current coding scheme, and determining the quantization parameter estimated value corresponding to the current video frame according to a quantization parameter of the reference video frame in a case that the current coding scheme is fixed-bit-rate coding; and using a quantization parameter corresponding to fixed-quality coding as the quantization parameter estimated value of the current video frame in a case that the current coding scheme is fixed-quality coding.

In an embodiment, the step of determining the quantization parameter estimated value corresponding to the current video frame according to a quantization parameter of the reference video frame includes: calculating an average quantization parameter of the reference video frame; obtaining a frame quantization parameter offset between a frame type of the reference video frame and a frame type of the current video frame in a case that the reference video frame and the current video frame are of different frame types; and determining the quantization parameter estimated value corresponding to the current video frame according to the average quantization parameter and the frame quantization parameter offset.

In an embodiment, the step of determining the quantization parameter estimated value corresponding to the current video frame according to the average quantization parameter and the frame quantization parameter offset includes: obtaining a coding quantization parameter offset between the full resolution mode and the down-sampling mode in a case that a coding mode of the reference video frame is the down-sampling mode; and using a sum of the average quantization parameter, the frame quantization parameter offset, and the coding quantization parameter offset as the quantization parameter estimated value corresponding to the current video frame.

In an embodiment, the step of coding the current video frame according to the target coding mode includes: obtaining the reference video frame of the current video frame in a case that the target coding mode is the full resolution mode, and performing up-sampling on a reconstructed image of the reference video frame to obtain a full-resolution reconstructed image in a case that the reconstructed image corresponding to the reference video frame is a down-sampling reconstructed image; performing full-resolution coding on the current video frame according to a full-resolution reconstructed image of the reference video frame; obtaining the reference video frame of the current video frame in a case that the target coding mode is the down-sampling mode, and performing down-sampling on the reconstructed image of the reference video frame to obtain a down-sampling reconstructed image in a case that the reconstructed image corresponding to the reference video frame is a full-resolution reconstructed image; and performing down-sampling coding on the current video frame according to the down-sampling reconstructed image of the reference video frame.

In an embodiment, the step of performing down-sampling coding on the current video frame according to the down-sampling reconstructed image of the reference video frame includes: obtaining a quantization parameter corresponding to each code unit in the current video frame; using a difference between the quantization parameter corresponding to the code unit and the coding quantization parameter offset as a target quantization parameter corresponding to the code unit; and performing down-sampling coding on the current video frame according to the target quantization parameter corresponding to each code unit.

In an embodiment, one or more computer readable non-volatile storage media storing computer readable instructions are proposed. When executed by one or more processors, the computer readable instructions cause the one or more processors to perform the following steps: obtaining a current video frame to be coded, and obtaining a predicted residual of a reference video frame of the current video frame in a case that the current video frame is an inter prediction frame; determining a quantization parameter threshold corresponding to the current video frame according to the predicted residual of the reference video frame; obtaining a quantization parameter estimated value corresponding to the current video frame; selecting a target coding mode from candidate coding modes according to the quantization parameter estimated value and the quantization parameter threshold, the candidate coding modes including a down-sampling mode and a full resolution mode; and coding the current video frame according to the target coding mode.

In an embodiment, the step of selecting a target coding mode from candidate coding modes according to the quantization parameter estimated value and the quantization parameter threshold, the candidate coding modes including a down-sampling mode and a full resolution mode includes: using the down-sampling mode as the target coding mode in a case that a difference between the quantization parameter estimated value and the quantization parameter threshold is greater than a preset threshold; otherwise, using the full resolution mode as the target coding mode.

In an embodiment, the step of obtaining a predicted residual of a reference video frame of the current video frame includes: obtaining sub-predicted residuals corresponding to pixels of the reference video frame; and collecting statistics on absolute values of the sub-predicted residuals to obtain the predicted residual of the reference video frame. The step of determining a quantization parameter threshold corresponding to the current video frame according to the predicted residual of the reference video frame includes: obtaining a quantity of pixels included in the reference video frame; calculating an average predicted residual corresponding to the reference video frame according to the quantity of pixels and the predicted residual; and determining the quantization parameter threshold corresponding to the current video frame according to the average predicted residual.

In an embodiment, in a case that the current video frame is a bi-directional predicted video frame, the step of obtaining a predicted residual of a reference video frame of the current video frame includes: obtaining a forward predicted residual of a forward reference video frame and a backward predicted residual of a backward reference video frame of the current video frame. The step of determining a quantization parameter threshold corresponding to the current video frame according to the predicted residual of the reference video frame includes: obtaining a quantity of forward pixels included in the forward reference video frame and a quantity of backward pixels included in the backward reference video frame; calculating a forward average predicted residual corresponding to the forward reference video frame according to the forward predicted residual and the quantity of forward pixels; calculating a backward average predicted residual corresponding to the backward reference video frame according to the backward predicted residual and the quantity of backward pixels; calculating a mean value according to the forward average predicted residual and the backward average predicted residual to obtain the average predicted residual corresponding to the reference video frame; and determining the quantization parameter threshold corresponding to the current video frame according to the average predicted residual.

In an embodiment, the step of determining the quantization parameter threshold corresponding to the current video frame according to the average predicted residual includes: obtaining a residual average reference value; using a preset first quantization parameter as the quantization parameter threshold corresponding to the current video frame in a case that the average predicted residual is greater than or equal to the residual average reference value; and using a preset second quantization parameter as the quantization parameter threshold corresponding to the current video frame in a case that the average predicted residual is less than the residual average reference value, the first quantization parameter being less than the second quantization parameter.

In an embodiment, the step of obtaining a quantization parameter estimated value corresponding to the current video frame includes: obtaining a current coding scheme, and determining the quantization parameter estimated value corresponding to the current video frame according to a quantization parameter of the reference video frame in a case that the current coding scheme is fixed-bit-rate coding; and using a quantization parameter corresponding to fixed-quality coding as the quantization parameter estimated value of the current video frame in a case that the current coding scheme is fixed-quality coding.

In an embodiment, the step of determining the quantization parameter estimated value corresponding to the current video frame according to a quantization parameter of the reference video frame includes: calculating an average quantization parameter of the reference video frame; obtaining a frame quantization parameter offset between a frame type of the reference video frame and a frame type of the current video frame in a case that the reference video frame and the current video frame are of different frame types; and determining the quantization parameter estimated value corresponding to the current video frame according to the average quantization parameter and the frame quantization parameter offset.

In an embodiment, the step of determining the quantization parameter estimated value corresponding to the current video frame according to the average quantization parameter and the frame quantization parameter offset includes: obtaining a coding quantization parameter offset between the full resolution mode and the down-sampling mode in a case that a coding mode of the reference video frame is the down-sampling mode; and using a sum of the average quantization parameter, the frame quantization parameter offset, and the coding quantization parameter offset as the quantization parameter estimated value corresponding to the current video frame.

In an embodiment, the step of coding the current video frame according to the target coding mode includes: obtaining the reference video frame of the current video frame in a case that the target coding mode is the full resolution mode, and performing up-sampling on a reconstructed image of the reference video frame to obtain a full-resolution reconstructed image in a case that the reconstructed image corresponding to the reference video frame is a down-sampling reconstructed image; performing full-resolution coding on the current video frame according to a full-resolution reconstructed image of the reference video frame; obtaining the reference video frame of the current video frame in a case that the target coding mode is the down-sampling mode, and performing down-sampling on the reconstructed image of the reference video frame to obtain a down-sampling reconstructed image in a case that the reconstructed image corresponding to the reference video frame is a full-resolution reconstructed image; and performing down-sampling coding on the current video frame according to the down-sampling reconstructed image of the reference video frame.

In an embodiment, the step of performing down-sampling coding on the current video frame according to the down-sampling reconstructed image of the reference video frame includes: obtaining a quantization parameter corresponding to each code unit in the current video frame; using a difference between the quantization parameter corresponding to the code unit and the coding quantization parameter offset as a target quantization parameter corresponding to the code unit; and performing down-sampling coding on the current video frame according to the target quantization parameter corresponding to each code unit.

A person skilled in the art can understand that all or some processes in the foregoing method embodiments may be completed through computer readable instructions instructing relevant hardware. The program may be stored in a non-volatile computer readable storage medium. When executed, the program may include the processes of the embodiments of the foregoing methods. Any reference to the memory, storage, database or other media used in the embodiments provided in this application may include a non-volatile memory and/or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache memory. As an illustration rather than a limitation, the RAM is available in many forms, for example, a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), a Rambus dynamic RAM (RDRAM), and the like.

The technical features of the foregoing embodiments can be combined randomly. To make the description concise, not all possible combinations of the technical features in the foregoing embodiments are described. However, all combinations of the technical features without contradiction are to be considered as the scope disclosed in this specification.

Only several implementations of this application are described above in detail, but the implementations are not to be construed as a limitation on the scope of this application. It is to be noted that, for a person of ordinary skill in the art, a plurality of alterations and improvements can be made without departing from the concept of this application, and all the alterations and improvements belong to the protection scope of this application. Therefore, the protection scope of this application is subject to the appended claims.

What is claimed is:

1. A video coding method performed at a computer device having one or more processors and memory storing programs to be executed by the one or more processors, the method comprising:
   obtaining, by the computer device, a current video frame to be coded, and obtaining a predicted residual of a reference video frame of the current video frame by determining the reference frame through an optimization process of comparing the current video frame with the reference video frame in a case that the current video frame is an inter prediction frame;
   determining, by the computer device, a quantization parameter threshold corresponding to the current video frame according to the predicted residual of the reference video frame, further including:
      obtaining, by the computer device, a quantity of pixels comprised in the reference video frame;
      calculating, by the computer device, an average predicted residual corresponding to the reference video frame according to the quantity of pixels and the predicted residual; and
      determining, by the computer device, the quantization parameter threshold corresponding to the current video frame according to the average predicted residual, wherein the average predicted residual is negatively correlated with the quantization parameter threshold;
   obtaining, by the computer device, a quantization parameter estimated value corresponding to the current video frame;
   selecting, by the computer device, a target coding mode from candidate coding modes according to the quantization parameter estimated value and the quantization parameter threshold, the candidate coding modes comprising a down-sampling mode and a full resolution mode, further including:
      using, by the computer device, the down-sampling mode as the target coding mode in a case that a difference between the quantization parameter estimated value and the quantization parameter threshold is greater than a preset threshold; otherwise, using the full resolution mode as the target coding mode; and
   coding, by the computer device, the current video frame according to the target coding mode.

2. The method according to claim 1, wherein the obtaining, by the computer device, a predicted residual of a reference video frame of the current video frame comprises:
   obtaining, by the computer device, sub-predicted residuals corresponding to pixels of the reference video frame; and
   collecting, by the computer device, statistics on absolute values of the sub-predicted residuals to obtain the predicted residual of the reference video frame.

3. The method according to claim 2, wherein the determining, by the computer device, the quantization parameter threshold corresponding to the current video frame according to the average predicted residual comprises:
   obtaining, by the computer device, a residual average reference value;

using, by the computer device, a preset first quantization parameter as the quantization parameter threshold corresponding to the current video frame in a case that the average predicted residual is greater than or equal to the residual average reference value; and using, by the computer device, a preset second quantization parameter as the quantization parameter threshold corresponding to the current video frame in a case that the average predicted residual is less than the residual average reference value, the first quantization parameter being less than the second quantization parameter.

4. The method according to claim 1, wherein in a case that the current video frame is a bi-directional predicted video frame, the obtaining, by the computer device, a predicted residual of a reference video frame of the current video frame comprises:

obtaining, by the computer device, a forward predicted residual of a forward reference video frame and a backward predicted residual of a backward reference video frame of the current video frame;

the operation of determining, by the computer device, a quantization parameter threshold corresponding to the current video frame according to the predicted residual of the reference video frame comprises:

obtaining, by the computer device, a quantity of forward pixels comprised in the forward reference video frame and a quantity of backward pixels comprised in the backward reference video frame;

calculating, by the computer device, a forward average predicted residual corresponding to the forward reference video frame according to the forward predicted residual and the quantity of forward pixels;

calculating, by the computer device, a backward average predicted residual corresponding to the backward reference video frame according to the backward predicted residual and the quantity of backward pixels;

calculating, by the computer device, a mean value according to the forward average predicted residual and the backward average predicted residual to obtain the average predicted residual corresponding to the reference video frame; and determining, by the computer device, the quantization parameter threshold corresponding to the current video frame according to the average predicted residual.

5. The method according to claim 4, wherein the determining, by the computer device, the quantization parameter estimated value corresponding to the current video frame according to a quantization parameter of the reference video frame comprises:

calculating, by the computer device, an average quantization parameter of the reference video frame;

obtaining, by the computer device, a frame quantization parameter offset between a frame type of the reference video frame and a frame type of the current video frame in a case that the reference video frame and the current video frame are of different frame types; and determining, by the computer device, the quantization parameter estimated value corresponding to the current video frame according to the average quantization parameter and the frame quantization parameter offset.

6. The method according to claim 5, wherein the determining, by the computer device, the quantization parameter estimated value corresponding to the current video frame according to the average quantization parameter and the frame quantization parameter offset comprises:

obtaining, by the computer device, a coding quantization parameter offset between the full resolution mode and the down-sampling mode in a case that a coding mode of the reference video frame is the down-sampling mode; and using, by the computer device, a sum of the average quantization parameter, the frame quantization parameter offset, and the coding quantization parameter offset as the quantization parameter estimated value corresponding to the current video frame.

7. The method according to claim 1, wherein the obtaining, by the computer device, a quantization parameter estimated value corresponding to the current video frame comprises:

obtaining, by the computer device, a current coding scheme, and determining the quantization parameter estimated value corresponding to the current video frame according to a quantization parameter of the reference video frame in a case that the current coding scheme is fixed-bit-rate coding; and using a quantization parameter corresponding to fixed-quality coding as the quantization parameter estimated value of the current video frame in a case that the current coding scheme is fixed-quality coding.

8. The method according to claim 1, wherein the coding, by the computer device, the current video frame according to the target coding mode comprises:

obtaining, by the computer device, the reference video frame of the current video frame in a case that the target coding mode is the full resolution mode, and performing up-sampling on a reconstructed image of the reference video frame to obtain a full-resolution reconstructed image in a case that the reconstructed image corresponding to the reference video frame is a down-sampling reconstructed image;

performing, by the computer device, full-resolution coding on the current video frame according to a full-resolution reconstructed image of the reference video frame;

obtaining, by the computer device, the reference video frame of the current video frame in a case that the target coding mode is the down-sampling mode, and performing down-sampling on the reconstructed image of the reference video frame to obtain a down-sampling reconstructed image in a case that the reconstructed image corresponding to the reference video frame is a full-resolution reconstructed image; and performing, by the computer device, down-sampling coding on the current video frame according to the down-sampling reconstructed image of the reference video frame.

9. The method according to claim 8, wherein the performing, by the computer device, down-sampling coding on the current video frame according to the down-sampling reconstructed image of the reference video frame comprises:

obtaining, by the computer device, a quantization parameter corresponding to each code unit in the current video frame;

using, by the computer device, a difference between the quantization parameter corresponding to the code unit and the coding quantization parameter offset as a target quantization parameter corresponding to the code unit; and performing, by the computer device, down-sampling coding on the current video frame according to the target quantization parameter corresponding to each code unit.

10. A computer device, comprising memory and one or more processors, the memory storing computer readable instructions that, when executed by the one or more processors, enable the one or more processors to perform the following operations:

obtaining, by the computer device, a current video frame to be coded, and obtaining a predicted residual of a reference video frame of the current video frame by determining the reference frame through an optimization process of comparing the current video frame with the reference video frame in a case that the current video frame is an inter prediction frame;

determining, by the computer device, a quantization parameter threshold corresponding to the current video frame according to the predicted residual of the reference video frame, further including:

obtaining, by the computer device, a quantity of pixels comprised in the reference video frame;

calculating, by the computer device, an average predicted residual corresponding to the reference video frame according to the quantity of pixels and the predicted residual; and determining, by the computer device, the quantization parameter threshold corresponding to the current video frame according to the average predicted residual, wherein the average predicted residual is negatively correlated with the quantization parameter threshold;

obtaining, by the computer device, a quantization parameter estimated value corresponding to the current video frame;

selecting, by the computer device, a target coding mode from candidate coding modes according to the quantization parameter estimated value and the quantization parameter threshold, the candidate coding modes comprising a down-sampling mode and a full resolution mode, further including:

using, by the computer device, the down-sampling mode as the target coding mode in a case that a difference between the quantization parameter estimated value and the quantization parameter threshold is greater than a preset threshold otherwise, using the full resolution mode as the target coding mode; and coding, by the computer device, the current video frame according to the target coding mode.

11. The computer device according to claim 10, wherein the obtaining, by the computer device, a predicted residual of a reference video frame of the current video frame comprises:

obtaining, by the computer device, sub-predicted residuals corresponding to pixels of the reference video frame; and collecting, by the computer device, statistics on absolute values of the sub-predicted residuals to obtain the predicted residual of the reference video frame.

12. The computer device according to claim 10, wherein in a case that the current video frame is a bi-directional predicted video frame, the obtaining, by the computer device, a predicted residual of a reference video frame of the current video frame comprises:

obtaining, by the computer device, a forward predicted residual of a forward reference video frame and a backward predicted residual of a backward reference video frame of the current video frame;

the operation of determining, by the computer device, a quantization parameter threshold corresponding to the current video frame according to the predicted residual of the reference video frame comprises:

obtaining, by the computer device, a quantity of forward pixels comprised in the forward reference video frame and a quantity of backward pixels comprised in the backward reference video frame;

calculating, by the computer device, a forward average predicted residual corresponding to the forward reference video frame according to the forward predicted residual and the quantity of forward pixels;

calculating, by the computer device, a backward average predicted residual corresponding to the backward reference video frame according to the backward predicted residual and the quantity of backward pixels;

calculating, by the computer device, a mean value according to the forward average predicted residual and the backward average predicted residual to obtain the average predicted residual corresponding to the reference video frame; and determining, by the computer device, the quantization parameter threshold corresponding to the current video frame according to the average predicted residual.

13. The computer device according to claim 10, wherein the obtaining, by the computer device, a quantization parameter estimated value corresponding to the current video frame comprises:

obtaining, by the computer device, a current coding scheme, and determining the quantization parameter estimated value corresponding to the current video frame according to a quantization parameter of the reference video frame in a case that the current coding scheme is fixed-bit-rate coding; and using a quantization parameter corresponding to fixed-quality coding as the quantization parameter estimated value of the current video frame in a case that the current coding scheme is fixed-quality coding.

14. The computer device according to claim 10, wherein the coding, by the computer device, the current video frame according to the target coding mode comprises;

obtaining, by the computer device, the reference video frame of the current video frame in a case that the target coding mode is the full resolution mode, and performing up-sampling on a reconstructed image of the reference video frame to obtain a full-resolution reconstructed image in a case that the reconstructed image corresponding to the reference video frame is a down-sampling reconstructed image;

performing, by the computer device, full-resolution coding on the current video frame according to a full-resolution reconstructed image of the reference video frame;

obtaining, by the computer device, the reference video frame of the current video frame in a case that the target coding mode is the down-sampling mode, and performing down-sampling on the reconstructed image of the reference video frame to obtain a down-sampling reconstructed image in a case that the reconstructed image corresponding to the reference video frame is a full-resolution reconstructed image; and performing, by the computer device, down-sampling coding on the current video frame according to the down-sampling reconstructed image of the reference video frame.

15. A non-transitory computer readable storage medium storing a plurality of machine readable instructions in connection with a computer device having one or more processors, wherein the plurality of machine readable instructions, when executed by the one or more processors, cause the computer device to perform a plurality of operations including:

obtaining, by the computer device, a current video frame to be coded, and obtaining a predicted residual of a reference video frame of the current video frame by determining the reference frame through an optimization process of comparing the current video frame with the reference video frame in a case that the current video frame is an inter prediction frame;

determining, by the computer device, a quantization parameter threshold corresponding to the current video frame according to the predicted residual of the reference video frame, further including:

obtaining, by the computer device, a quantity of pixels comprised in the reference video frame;

calculating, by the computer device, an average predicted residual corresponding to the reference video frame according to the quantity of pixels and the predicted residual; and determining, by the computer device, the quantization parameter threshold corresponding to the current video frame according to the average predicted residual, wherein the average predicted residual is negatively correlated with the quantization parameter threshold;

obtaining, by the computer device, a quantization parameter estimated value corresponding to the current video frame;

selecting, by the computer device, a target coding mode from candidate coding modes according to the quantization parameter estimated value and the quantization parameter threshold, the candidate coding modes comprising a down-sampling mode and a full resolution mode, further including:

using, by the computer device, the down-sampling mode as the target coding mode in a case that a difference between the quantization parameter estimated value and the quantization parameter threshold is greater than a preset threshold; otherwise, using the full resolution mode as the target coding mode; and coding, by the computer device, the current video frame according to the target coding mode.

16. The non-transitory computer readable storage medium according to claim 15, wherein the obtaining, by the computer device, a predicted residual of a reference video frame of the current video frame comprises:

obtaining, by the computer device, sub-predicted residuals corresponding to pixels of the reference video frame; and collecting, by the computer device, statistics on absolute values of the sub-predicted residuals to obtain the predicted residual of the reference video frame.

17. The non-transitory computer readable storage medium according to claim 15, wherein in a case that the current video frame is a bi-directional predicted video frame, the obtaining, by the computer device, a predicted residual of a reference video frame of the current video frame comprises:

obtaining, by the computer device, a forward predicted residual of a forward reference video frame and a backward predicted residual of a backward reference video frame of the current video frame;

the operation of determining, by the computer device, a quantization parameter threshold corresponding to the current video frame according to the predicted residual of the reference video frame comprises:

obtaining, by the computer device, a quantity of forward pixels comprised in the forward reference video frame and a quantity of backward pixels comprised in the backward reference video frame;

calculating, by the computer device, a forward average predicted residual corresponding to the forward reference video frame according to the forward predicted residual and the quantity of forward pixels;

calculating, by the computer device, a backward average predicted residual corresponding to the backward reference video frame according to the backward predicted residual and the quantity of backward pixels;

calculating, by the computer device, a mean value according to the forward average predicted residual and the backward average predicted residual to obtain the average predicted residual corresponding to the reference video frame; and determining, by the computer device, the quantization parameter threshold corresponding to the current video frame according to the average predicted residual.

* * * * *